United States Patent
Tamaki

(10) Patent No.: US 8,705,683 B2
(45) Date of Patent: Apr. 22, 2014

(54) RECYCLED FUEL ASSEMBLY STORAGE BASKET AND RECYCLED FUEL ASSEMBLY STORAGE CONTAINER

(75) Inventor: Hiroki Tamaki, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 848 days.

(21) Appl. No.: 12/808,836

(22) PCT Filed: Jan. 26, 2009

(86) PCT No.: PCT/JP2009/051226
§ 371 (c)(1), (2), (4) Date: Jun. 17, 2010

(87) PCT Pub. No.: WO2009/096369
PCT Pub. Date: Aug. 6, 2009

(65) Prior Publication Data
US 2011/0122985 A1    May 26, 2011

(30) Foreign Application Priority Data
Jan. 30, 2008  (JP) .................................. 2008-019038

(51) Int. Cl.
*G21C 19/06*  (2006.01)
*G21C 19/00*  (2006.01)

(52) U.S. Cl.
USPC ..... 376/272; 376/260; 250/493.1; 250/496.1; 250/505.1; 250/506.1; 250/507.1; 588/249

(58) Field of Classification Search
USPC .......... 588/249; 220/639, 660; 376/260, 272; 250/505.1, 506.1, 507.1, 496.1, 493.1, 250/497.1, 498.1
See application file for complete search history.

(56) References Cited

U.S. PATENT DOCUMENTS 3,715,237 A * 2/1973 Walker ...................... 250/496.1
4,024,406 A * 5/1977 Bevilacqua ................... 376/272
4,567,015 A * 1/1986 Bosshard ....................... 376/272
(Continued)

FOREIGN PATENT DOCUMENTS

JP    58-71491 A    4/1983
JP    1-269091 A    10/1989
(Continued)

OTHER PUBLICATIONS

International Search Report of PCT/JP2009/051226, mailing date of Apr. 21, 2009.
(Continued)

*Primary Examiner* — Bernarr Gregory
(74) *Attorney, Agent, or Firm* — Westerman, Hattori, Daniels & Adrian, LLP

(57) ABSTRACT

A plurality of first plate members 10 is stacked with long side ends 10LT1 and 10LT2 thereof abutting to each other. Plate member joint bodies 100 are formed by attaching connecting members 30 to side surfaces 10S of the stacked first plate members 10, and connecting the first plate members 10. Further, the plate member joint bodies 100 are so disposed to face each other, and the connecting members 30 projecting from the side surfaces 10S of the first plate members 10 are inserted into recesses formed at both long side ends of second plate members 20. A recycled fuel assembly storage basket 1 is thus formed. Recycled fuel assemblies are stored in spaces surrounded by the first plate members 10 and the second plate members 20.

14 Claims, 22 Drawing Sheets

(56) References Cited

U.S. PATENT DOCUMENTS

| | | | |
|---|---|---|---|
| 4,626,402 A * | 12/1986 | Baatz et al. | 376/272 |
| 4,815,605 A * | 3/1989 | Brissier et al. | 376/272 |
| 5,032,348 A * | 7/1991 | Blum et al. | 376/272 |
| 5,063,299 A * | 11/1991 | Efferding | 250/507.1 |
| 5,394,449 A * | 2/1995 | Johnson et al. | 376/272 |
| 5,881,120 A * | 3/1999 | Chanzy et al. | 376/272 |
| 5,914,994 A * | 6/1999 | Wasinger et al. | 376/272 |
| 6,064,709 A | 5/2000 | Robert et al. | |
| 6,674,827 B2 * | 1/2004 | de la Pena et al. | 376/272 |
| 6,727,510 B2 * | 4/2004 | Matsunaga et al. | 250/496.1 |
| 6,878,952 B1 | 4/2005 | Ohsono et al. | |
| 7,327,821 B2 * | 2/2008 | Ishihara et al. | 376/272 |
| 7,961,834 B2 * | 6/2011 | Andre et al. | 376/272 |
| 2004/0022345 A1 | 2/2004 | Hermouet et al. | |
| 2005/0220255 A1 | 10/2005 | Hermouet et al. | |

FOREIGN PATENT DOCUMENTS

| | | |
|---|---|---|
| JP | 6-94892 A | 4/1994 |
| JP | 8-136695 A | 5/1996 |
| JP | 11-14785 A | 1/1999 |
| JP | 2001-074884 A | 3/2001 |
| JP | 2001-201595 A | 7/2001 |
| JP | 2004-020568 A | 1/2004 |
| JP | 2004-69620 A | 3/2004 |
| JP | 2004-163120 A | 6/2004 |
| JP | 2004-212063 A | 7/2004 |
| JP | 2005-208062 A | 8/2005 |
| KR | 10-2002-0069503 A | 9/2002 |
| KR | 10-2005-0046730 A | 5/2005 |
| KR | 10-2008-0109079 A | 12/2008 |
| WO | 2007/132863 A1 | 11/2007 |

OTHER PUBLICATIONS

Supplementary European Search Report dated Feb. 16, 2012, issued in corresponding European Patent Application No. 09705144.5.
European Search Report dated Feb. 1, 2013, issued in corresponding European Patent Application No. 09705144.5.
Notice of Allowances dated May 4, 2012, issued in corresponding Korean Patent Application No. 10-2010-7016979, with English Translation (3 pages).
Japanese Office Action dated May 8, 2012, issued in corresponding Japanese Patent Application No. 2008-019038, with English translation (5 pages).

* cited by examiner

RECYCLED FUEL ASSEMBLY STORAGE BASKET AND RECYCLED FUEL ASSEMBLY STORAGE CONTAINER

TECHNICAL FIELD

The present invention relates to a recycled fuel assembly storage basket and a recycled fuel assembly storage container that store therein recycled fuel assemblies, and a method for manufacturing a recycled fuel assembly storage basket.

BACKGROUND ART

Spent nuclear fuel assemblies that are nuclear fuel assemblies used in nuclear power plants, for example, and extracted from nuclear reactors after being loaded and burned in the nuclear reactors are called recycled fuel assemblies. The recycled fuel assemblies contain highly radioactive substances such as fission products (FP). Accordingly, the recycled fuel assemblies are generally cooled in a cooling pit of a nuclear power plant, for example, for a certain period of time. The recycled fuel assemblies are then stored in a cask that is a recycled fuel assembly storage container having a radiation shielding function and used for transportation and storage, delivered to a reprocessing plant or an interim storage facility by a vehicle or a vessel, and stored therein until being reprocessed.

To store the recycled fuel assemblies in the cask, a recycled fuel assembly storage basket formed of a material having neutron absorbing power, and is a collection of storage spaces called cells in which recycled fuel assemblies are stored, is used. The recycled fuel assemblies are inserted into the storage spaces formed in the recycled fuel assembly storage basket, one by one. In this manner, the recycled fuel assemblies maintain appropriate intervals and are prevented from reaching criticality while being transported, and an appropriate holding force relative to vibrations during transportation, events that can be assumed, and the like is secured. Patent Documents 1 to 5 are, examples of such conventional recycled fuel assembly storage baskets. Patent Document 6 discloses a method for forming spaces in which recycled fuel assemblies are stored, by intersecting and combining plate-shaped members made of boron-aluminum (B—Al) material, with one another.

[Patent Document 1] Japanese Patent Application Laid-open No. 2004-020568
[Patent Document 2] Japanese Patent Application Laid-open No. 2004-069620
[Patent Document 3] Japanese Patent Application Laid-open No. 2004-163120
[Patent Document 4] Japanese Patent Application Laid-open No. 2005-208062
[Patent Document 5] Japanese Patent Application Laid-open No. H6-94892
[Patent Document 6] Japanese Patent Application Laid-open No. 2001-201595

SUMMARY OF THE INVENTION

Problem to be Solved by the Invention

Because boron is very hard, the B—Al material is difficult to cut. Accordingly, it is difficult to cut the plate-shaped members of a recycled fuel assembly storage basket disclosed in Patent Document 1, thereby requiring extra efforts to manufacture the recycled fuel assembly storage basket. In a recycled fuel assembly storage basket disclosed in Patent Document 1, materials are wasted due to cutting.

Accordingly, the present invention has been made in view of the circumstances described above, and an object of the present invention is to provide a recycled fuel assembly storage basket and a recycled fuel assembly storage container that can reduce the number of cutting processes on the members of the recycled fuel assembly storage basket, and a method for manufacturing a recycled fuel assembly storage basket.

Means for Solving Problem

According to an aspect of the invention, a recycled fuel assembly storage basket includes: a plurality of first plate members being stacked with long side ends thereof abutting to each other; a plurality of connecting members extended in a direction towards which the first plate members are stacked, attached to a side surface of each of the first plate members being stacked, connecting the first plate members, and projecting from the side surface; a plurality of second plate members both of whose long side ends have recesses into which the connecting members are fitted; and a recycled fuel assembly stored in a space surrounded by the first plate members and the second plate members.

In this recycled fuel assembly storage basket, a plate member joint body is formed by stacking first plate members and connecting the first plate members with a connecting member, disposing a plurality of plate member joint bodies so that the connecting members are placed opposite from each other, and inserting each of the connecting members into a recess of a second plate member. The first plate member, the second plate member, and the connecting member that are members of the recycled fuel assembly storage basket can be manufactured, for example, by extrusion molding. Accordingly, with the recycled fuel assembly storage basket according to the present invention, the number of cutting processes on the members of the recycled fuel assembly storage basket can be reduced.

As an exemplary aspect of the present invention, in the recycled fuel assembly storage basket, it is preferable that each of the first plate members and the second plate members has a through hole penetrating in a longitudinal direction. In this manner, in particular, in a basket that stores therein recycled fuel assemblies for a pressurized water reactor (PWR), the through hole can be used as a flux trap for moderating fast neutrons from the recycled fuel assemblies.

As an exemplary aspect of the present invention, in the recycled fuel assembly storage basket, it is preferable that a cross-section of each of the connecting members perpendicular to the longitudinal direction is a trapezoid, and an upper base of the cross-section comes into contact with the side surface of the first plate member. As an exemplary aspect of the present invention, in the recycled fuel assembly storage basket, it is preferable that a cross-section of each of the recesses in the second plate member perpendicular to the longitudinal direction is a trapezoid, and an upper base side of the cross-section comes into contact with the side surface of the first plate member. In this manner, by forming the cross-section of the connecting member in a trapezoid, and forming the recess meshed with the connecting member at the long side end of the second plate member, it is possible to prevent the second plate member from being disengaged from the connecting member. It is also possible to facilitate the assembly and handling of the recycled fuel assembly storage basket, and the deviation between the first plate member and the second plate member can be suppressed.

As an exemplary aspect of the present invention, in the recycled fuel assembly storage basket, it is preferable that the second plate member and the connecting member be made of different materials. If the second plate member and the connecting member are made of materials of the same type, material loss may occur on the second plate member and the connecting member due to galling. However, this can be prevented, by forming the second plate member and the connecting member with different materials.

Examples of methods for adopting a different material may include using the same base material and performing oxidation treatment, thermal spraying, plating, or other surface treatment to make only the surface have different characteristics from those of the second plate member to prevent galling; coating the surface of the second plate member or the connecting member with a lubricating layer represented by graphite and the like; using the surface treatment and the lubricating layer coating in combination; and using a material having relatively higher strength and higher hardness (stainless, carbon steel, titanium, or the like) than the strength and hardness of the second plate member for the base material of the connecting member. As a different material, a material softer than the second plate member may be chosen for the connecting member. In this case, to receive the load in a dispersed manner, the number of connecting members must be increased or the size of the connecting member must be enlarged. Accordingly, this is not suitable for the purpose of producing an inexpensive recycled fuel assembly storage basket. However, as a basket exclusively used as a storage container, if the assumed load is lighter than that of the transportation-storage container, a soft material may be possibly chosen for the connecting member.

As an exemplary aspect of the present invention, in the recycled fuel assembly storage basket, it is preferable that the connecting member be divided at different positions in the direction towards which the first plate members are stacked. In this manner, a plate member joint body (barrier) that is a joint body of the first plate members is formed, by dividing the connecting member at different positions in the direction towards which the first plate members are stacked, in other words, in the longitudinal direction of the connecting member, and attaching the connecting member to the side surfaces of the first plate members. Accordingly, the entire length of the connecting member, in other words, the size in the longitudinal direction can be reduced, thereby relieving the effects due to difference in thermal elongation, caused when the material of the connecting member and the material of the first plate member are different.

As an exemplary aspect of the present invention, in the recycled fuel assembly storage basket, it is preferable that the connecting member be attached to the first plate member by a fastening member. In this manner, the connecting member can be fixed to the first plate member without fail, thereby connecting a plurality of plate members without fail.

As an exemplary aspect of the present invention, in the recycled fuel assembly storage basket, it is preferable that a long hole be provided at a side of the connecting member, and the fastening member penetrate through the long hole. By using the long hole, the connecting member is movable relative to the fastening member, thereby allowing a relative movement between the connecting member and the first plate member. As a result, it is possible to relive the thermal stress generated due to difference in thermal elongation, caused when the material of the connecting member and the material of the first plate member are different.

As an exemplary aspect of the present invention, in the recycled fuel assembly storage basket, it is preferable that a load supporting unit that supports a load of the second plate member be interposed between the fastening member and the connecting member, and between the fastening member and the first plate member. In this manner, the load transmitted to the fastening member from the second plate member through the connecting member is received by the load supporting unit. Accordingly, it is possible to suppress the stress applied to the fastening member.

As an exemplary aspect of the present invention, in the recycled fuel assembly storage basket, it is preferable that at least one rotation suppressing member that suppresses rotation of the load supporting unit be provided between the load supporting unit and the first plate member, and between the load supporting unit and the second plate member. For example, if a key having a circular cross-section is used for the load supporting member, the rotation of the load supporting unit is suppressed, by the rotation suppressing member, thereby facilitating the operation of attaching the connecting member and the first plate member with the fastening member. Accordingly, the workability is improved.

As an exemplary aspect of the present invention, in the recycled fuel assembly storage basket, it is preferable that a reinforcement member made of a material having higher stiffness than that of the first plate member be disposed inside the through hole of the first plate member, and the reinforcement member and the fastening member be connected. In such a structure, a part of the load applied to the first plate member can be received by the reinforcement member, thereby forming the recycled fuel assembly storage basket further stronger. For example, if a bolt, a screw, or the like is used as the fastening member, the fastening member is connected with a nut. By using this structure, screw holes need not be formed on the first plate member.

As an exemplary aspect of the present invention, in the recycled fuel assembly storage basket, it is preferable that a groove extending in the direction towards which the first plate members are stacked be formed at the side surface of the first plate member, and the connecting member be fitted into the groove. In this manner, the load applied to the first plate member from the connecting member can be received by a portion where the connecting member and the groove are engaged. As a result, the load applied to the fastening member for fixing the connecting member to the first plate member can be drastically reduced, thereby reducing the size of the fastening member and the number of fastening members.

According to another aspect of the present invention, a recycled fuel assembly storage container includes: a trunk having an opening portion and a cavity; a lid attached to the opening portion and sealing the cavity; and the recycled fuel assembly storage basket described above which is disposed in the cavity.

This recycled fuel assembly storage container includes the recycled fuel assembly storage basket according to the present invention. Accordingly, the number of cutting processes on the members of the recycled fuel assembly storage basket can be reduced.

According to still another aspect of the present invention, a method for manufacturing a recycled fuel assembly storage basket includes: stacking a plurality of first plate members with long side ends thereof abutting to each other; forming a plurality of plate member joint bodies by connecting the first plate members with connecting members attached to a side surface of each of the first plate members and projecting from the side surface; disposing side surfaces of the plate member joint bodies so as to face each other, and placing the connecting members opposite from each other; and inserting the connecting members placed opposite from each other into recesses formed at both long side ends of a second plate member. According to the method for manufacturing a recycled fuel assembly storage basket, the number of cutting processes on the members of the recycled fuel assembly storage basket can be reduced.

Effect of the Invention

The present invention can reduce the number of cutting processes on the members of a recycled fuel assembly storage basket.

Figure 1:
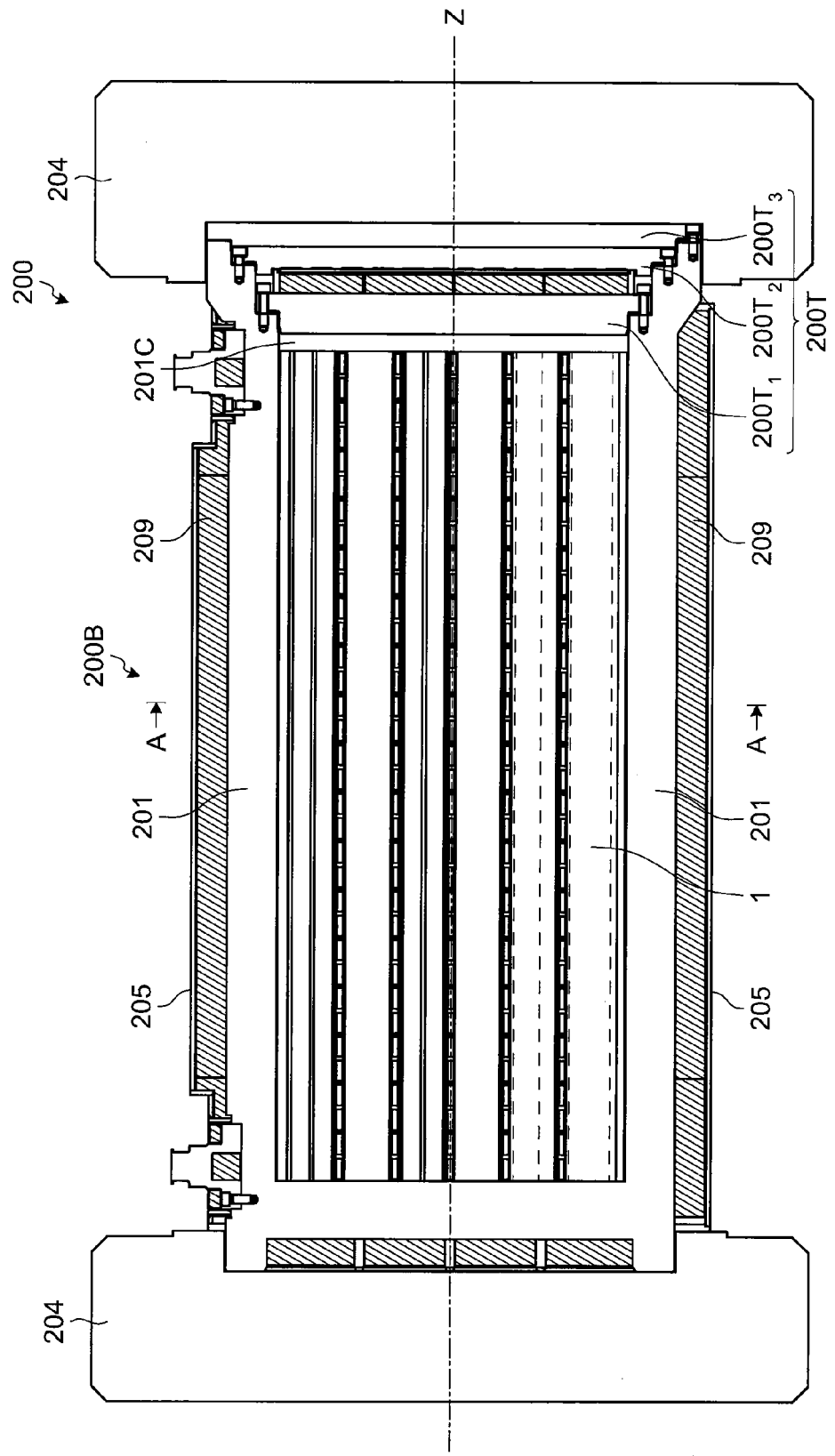
FIG. 1 is a sectional view of an outline of a cask that is an example of a recycled fuel assembly storage container.

EXPLANATIONS OF LETTERS OR NUMERALS 1, 1*a*, 1*b* basket (recycled fuel assembly storage basket)
10, 10*b*, 10*c* first plate member
10H screw hole
10H1 key receiving recess
10H2 key receiving hole
10H3 fixed key groove
10H4 bolt through hole
10LT1, 10LT2 long side end
10S, 10Sb side surface
10ST short side end
11 protruded portion
12 groove
13 through hole
15 leg
16, 16*c* connecting member fitting groove
20, 20*b*, 20*c* second plate member
20LT long side end
20S side surface
20ST short side end
21, 21*c* recess
21H groove opening
23 through hole
30, 30*b*, 30*c* connecting member 30A first side surface
30B second side surface
31 bolt through hole
32 key receiving recess
33, 35 bolt screw hole
34 bolt through hole
40, 40a bolt
41, 42, 43 load supporting key
41H through hole
42 key hole
42H, 43H through hole
44 fixed key
50 reinforcement member
50H screw hole
100, 100a plate member joint body
200 cask
201 trunk main body
201C cavity

DETAILED DESCRIPTION OF THE INVENTION

The present invention will now be described in detail with reference to the drawings. However, the present invention is not limited to the best modes (hereinafter, "embodiments") for carrying out the invention. Constituent elements of the following embodiments include elements that can be easily assumed by a person skilled in the art, elements being substantially the same as those elements, and elements that fall within a so-called range of equivalents. A recycled fuel assembly storage basket, which will be described below, is mainly used as a cask for transportation and storage, but not limited thereto. For example, the recycled fuel assembly storage basket may be used as a concrete cask for storing purpose or a rack in a canister or in a recycled fuel assembly storage pool. The present invention is also applicable for recycled fuel assemblies used in either a pressurized water reactor (PWR) or a boiling water reactor (BWR).

First Embodiment

In a first embodiment, a recycled fuel assembly storage basket is formed by stacking a plurality of first plate members with long side ends thereof abutting to each other, connecting the first plate members by attaching a connecting member to the side surfaces of the first plate members being stacked, and inserting the connecting member projecting from the side surfaces of the first plate members into a recess of a second plate member both of whose long side ends have recesses. Each of the recycled fuel assemblies is stored in a space surrounded by the first plate members and the second plate members. Before explaining a recycled fuel assembly storage basket according to the first embodiment, a recycled fuel assembly storage container will be described. In the following explanation, a recycled fuel assembly storage basket is referred to as "basket" as needed.

Figure 2:
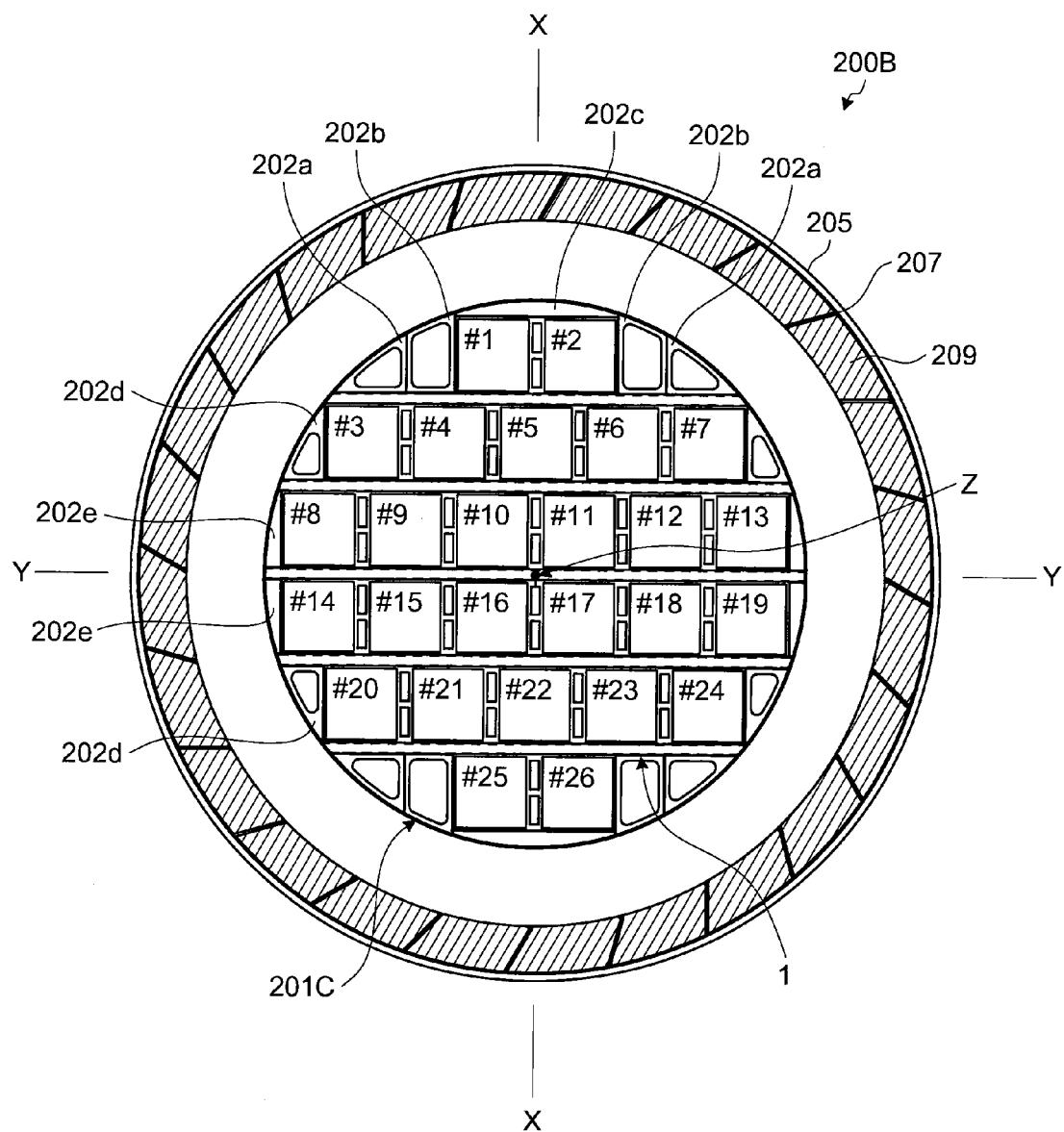
FIG. 2 is a sectional view taken along the line A-A of the cask illustrated in FIG. 1.

FIG. 1 is a sectional view of an outline of a cask that is an example of a recycled fuel assembly storage container. FIG. 2 is a sectional view taken along the line A-A of the cask illustrated in FIG. 1. As illustrated in FIG. 1, a cask 200 includes a lid 200T and a trunk 200B, and after storing recycled fuel assemblies in the inside of the trunk 200B, the trunk 200B is sealed by the lid 200T. The trunk 200B of the cask 200, as illustrated in FIG. 2, includes a cylindrical trunk main body 201, heat transfer fins 207 attached to the outer periphery of the trunk main body 201, an outer casing 205 attached to the other long side ends of the heat transfer fins 207, and a neutron shielding material 209 filled into a space formed by the outer periphery of the trunk 200B, the heat transfer fins 207, and the outer casing 205. To exert a gamma-ray shielding function, the trunk main body 201 is manufactured of carbon steel or stainless steel having a sufficient thickness. If the trunk main body 201 is manufactured of carbon steel, to exert a sufficient gamma-ray shielding function, the thickness of the trunk main body 201 is from 20 to 30 centimeters.

The trunk main body 201 may be formed, by attaching a bottom plate to the cylindrical trunk main body 201 by welding. The trunk main body 201 and the bottom plate may also be integrally formed, by inserting a metal billet into a container having the inner shape matched with the exterior shape of the trunk main body 201, and hot-forming the metal billet with a piercing punch having the exterior shape matched with the inner shape of the trunk main body 201. The trunk main body 201 may also be manufactured by casting.

The inside of the trunk main body 201 is a cavity 201C in which a basket 1 for containing recycled fuel assemblies is stored. The cross-sectional internal shape perpendicular to the axis (cavity axis Z) direction of the cavity 201C is circular. However, depending on the specification of the cask 200, a cavity having a cross-sectional internal shape such as octagon, square, an approximately cross shape, and a step-like shape may also be used. In the present embodiment, the cross-sectional internal shape of the cavity 201C is circular. Accordingly, to store the basket 1 having a polygonal exterior shape therein, a first spacer 202a to a fifth spacer 202e are interposed between the basket 1 and the cavity 201C, thereby positioning the basket 1 in the cavity 201C. A groove in which a plate member of the basket 1 is fitted in may be provided in the first spacer 202a to the fifth spacer 202e, and the first spacer 202a to the fifth spacer 202e, and the plate member may be combined by a shrink fit, a cold shrink fit, or the like.

The outer peripheral surface of the basket 1 preferably comes into contact with the inner wall of the cavity 201C. Accordingly, while securing a subcritical function, heat is transferred to the container on a wide surface, thereby transferring heat at a small temperature difference. In this manner, even if a borated stainless steel (B-SUS) having inferior heat transfer characteristics than that of the B—Al material is used, the temperature of the stored article can be kept low. If the B—Al material is used, the temperature of the stored article can be kept lower.

Upon storing recycled fuel assemblies in the cavity 201C, to prevent radioactive substances from leaking out the cavity 201C, the cavity 201C is sealed by attaching a primary lid $200T_1$, a secondary lid $200T_2$, and a tertiary lid $T_3$ (FIG. 1) at an opening portion of the trunk. To secure sealability, a gasket made of metal or elastomer, or made of metal and elastomer, is provided between the primary lid $200T_1$ and the secondary lid $200T_2$, and the trunk main body 201. The tertiary lid $T_3$ is used for the purpose of further backing up the primary lid $T_1$ and the secondary lid $T_2$. However, depending on the required specification, this lid structure may only include the primary lid and the secondary lid.

The heat transfer fins 207 formed of plate members are radially attached to the outer periphery of the trunk main body 201. The heat transfer fins 207 are made of a good thermal conductor such as aluminum plate and copper plate, and attached to the outer periphery of the trunk main body 201 by welding or other connecting means, thereby efficiently transmitting the heat. The outer casing 205 made of carbon steel with a thickness of a few centimeters is attached to the outside of the heat transfer fins 207 by welding or other connecting means. The recycled fuel assemblies stored in the cavity 201C generate decay heat. The decay heat is transmitted to the basket 1 and the trunk main body 201, conducted to the outer casing 205 through the heat transfer fins 207, and released to the atmosphere from the surface of the outer casing 205.

To shield neutrons, a material having a neutron shielding function (neutron shielding material 209) is filled into a space surrounded by the trunk main body 201, the outer casing 205, and two heat transfer fins 207. As a material having such a function, a neutron shielding material such as resin, polyurethane, or silicon that is a polymer material containing a large amount of hydrogen, can be used. The neutron shielding material shields neutrons emitted from the recycled fuel assemblies, and reduces the number of neutrons leaking out from the cask 200 to less than the regulated limit.

The cask 200, upon storing recycled fuel assemblies therein, is used for transportation and storage. To transport the cask, as illustrated in FIG. 1, buffers 204 are attached to both ends of the axis of the cask, in other words, in the direction of the cavity axis Z. Therefore, should an accident such as falling of the cask 200 occurs, a sufficient sealability of the container and safety of the stored articles will be ensured. The basket according to the present embodiment will now be described.

Figure 3:
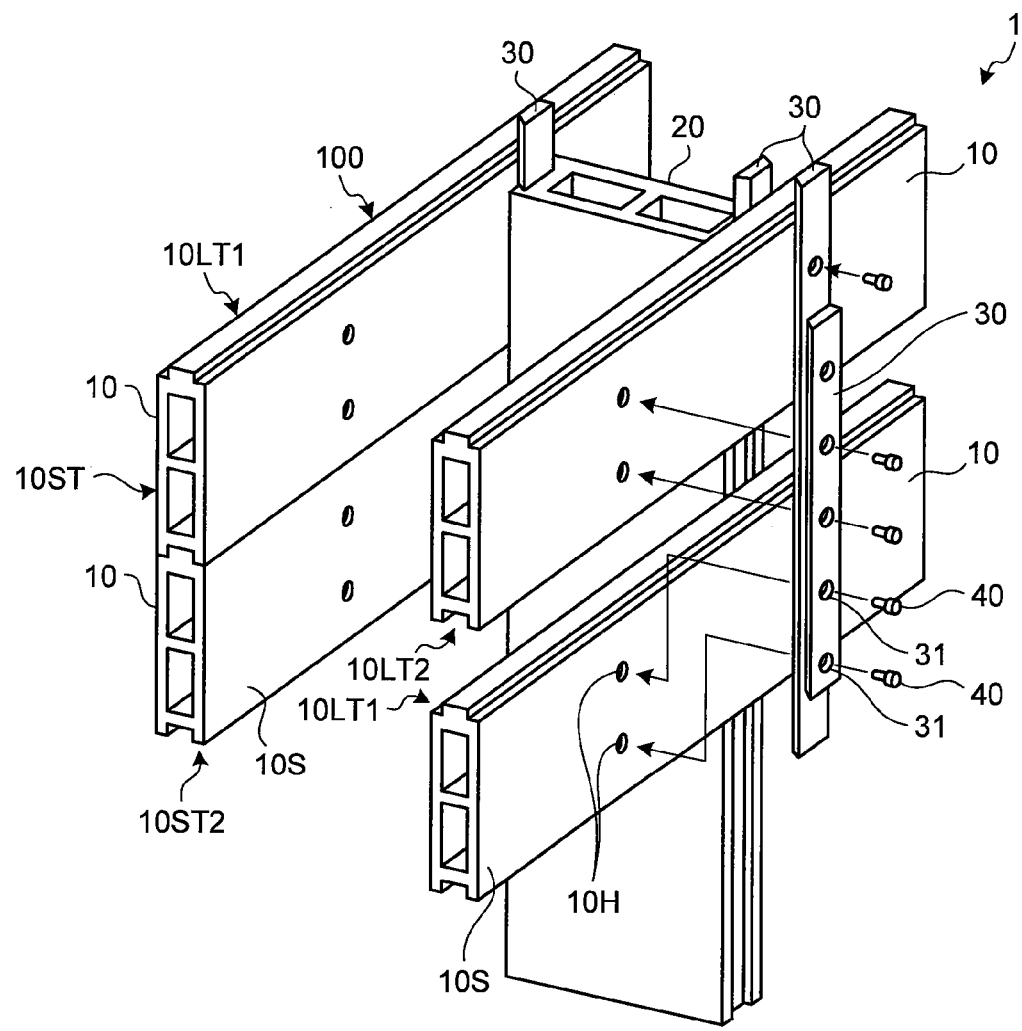
FIG. 3 is a perspective view of a basket according to a first embodiment.
Figure 4:
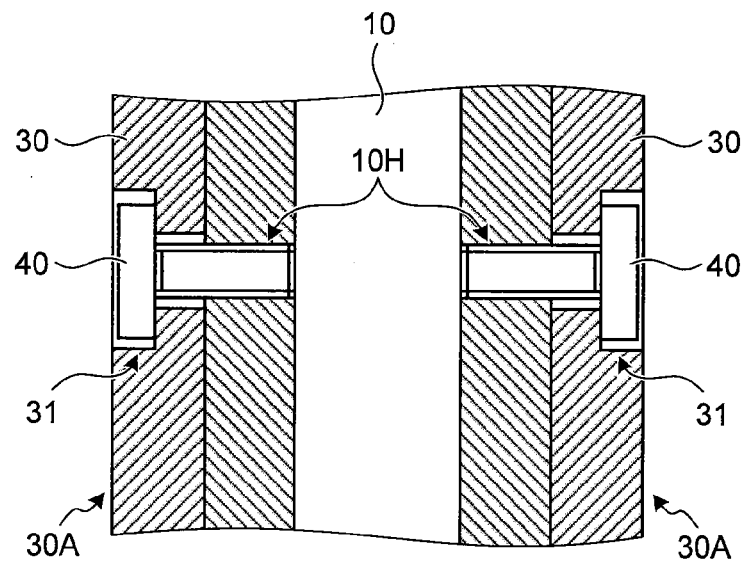
FIG. 4 is a sectional view of a portion in which connecting members are attached to a first plate member in the basket according to the first embodiment.
Figure 5:
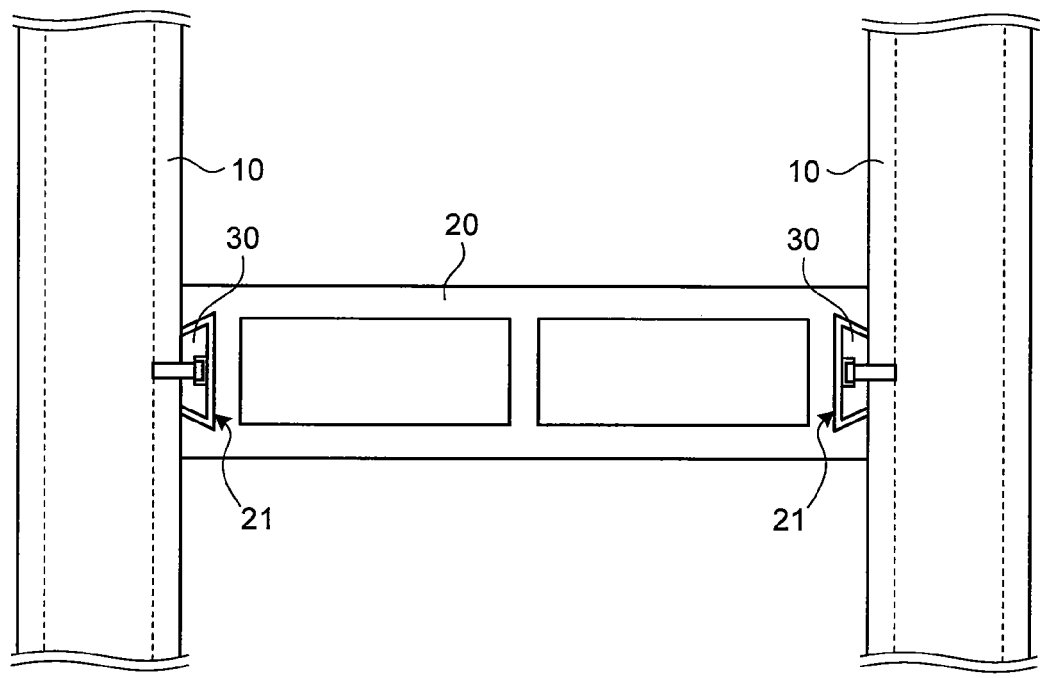
FIG. 5 is an enlarged partial view of the basket according to the first embodiment.
Figure 6A:
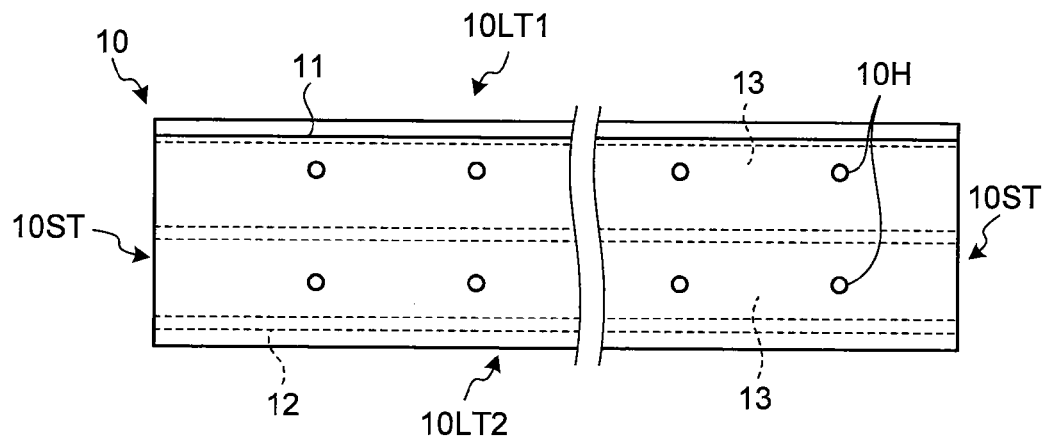
FIG. 6A is a side elevation view of the first plate member of the basket according to the first embodiment.
Figure 6B:
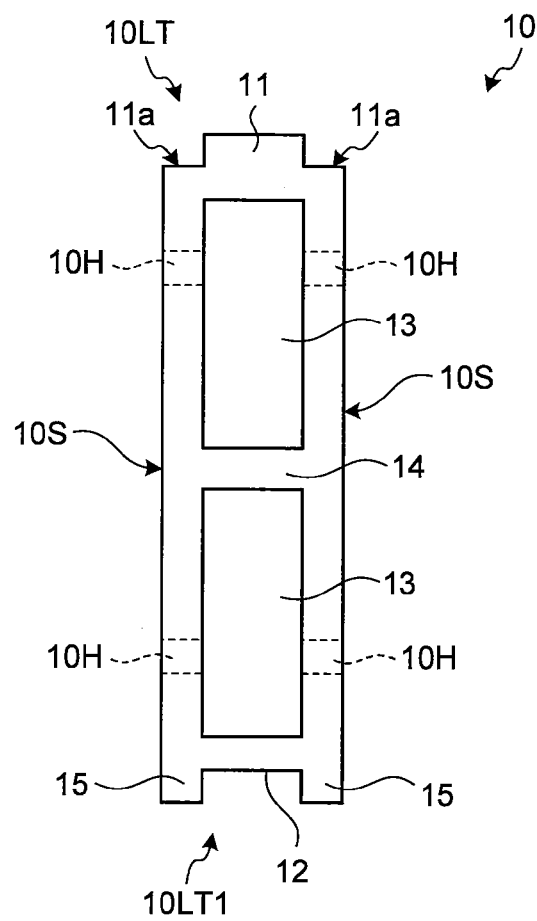
FIG. 6B is a side elevation view of the first plate member of the basket according to the first embodiment.
Figure 6C:
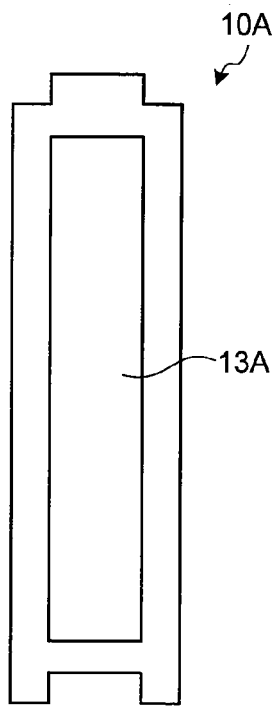
FIG. 6C is a front view of a modification of the first plate member of the basket according to the first embodiment.
Figure 6D:
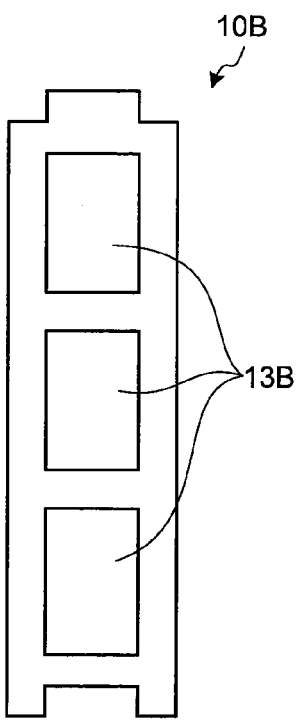
FIG. 6D is a front view of a modification of the first plate member of the basket according to the first embodiment.
Figure 6E:
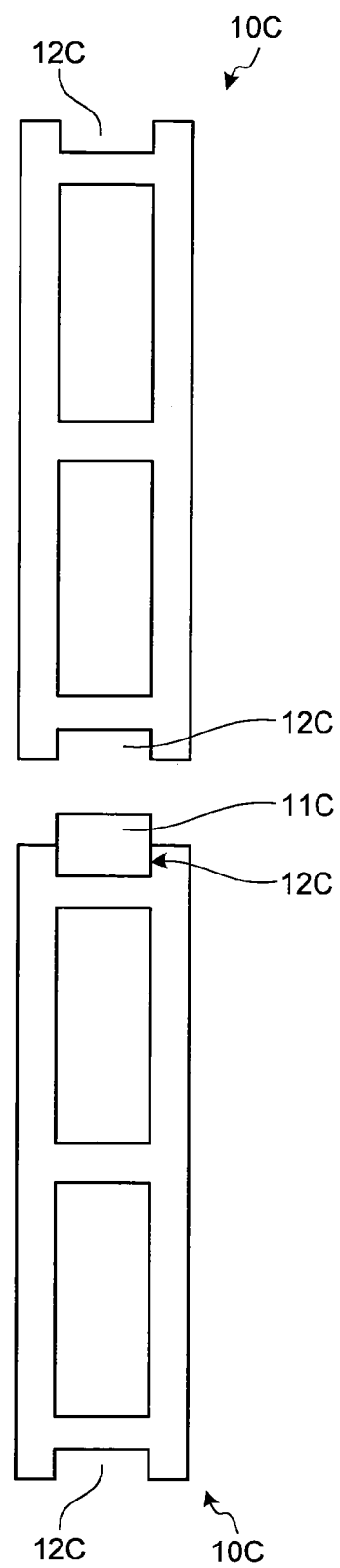
FIG. 6E is a front view of a modification of the first plate member of the basket according to the first embodiment.
Figure 7:
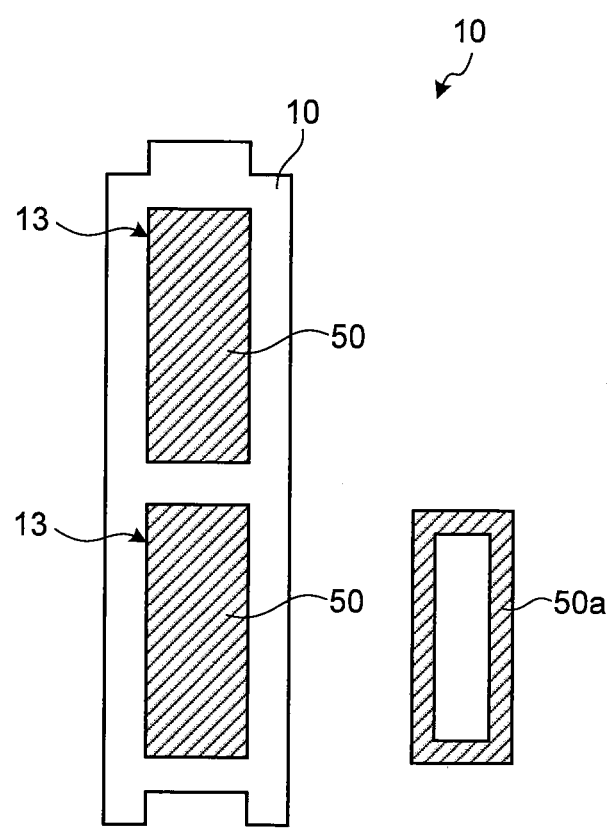
FIG. 7 is a front view of a modification of the first plate member of the basket according to the first embodiment.
Figure 8A:
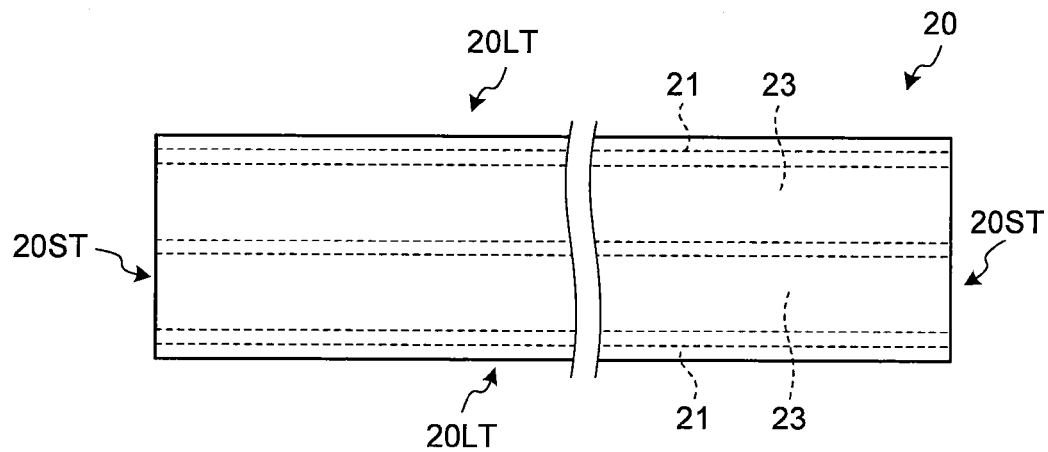
FIG. 8A is a side elevation view of a second plate member of the basket according to the first embodiment.
Figure 8B:
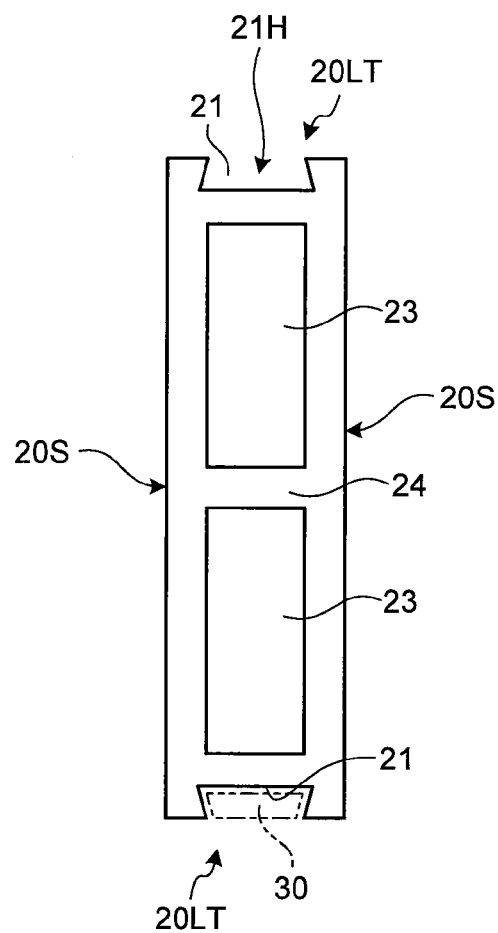
FIG. 8B is a front view of the second plate member of the basket according to the first embodiment.
Figure 9A:
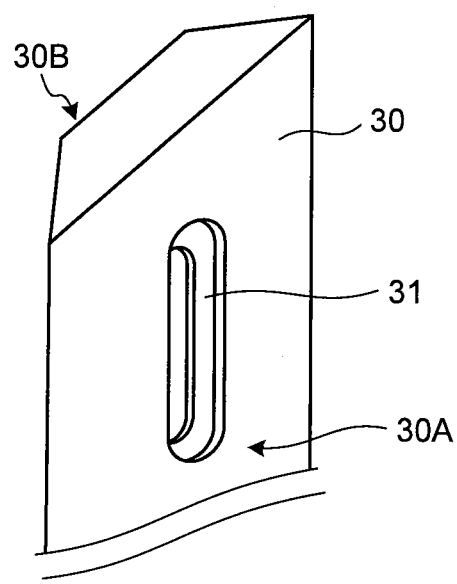
FIG. 9A is a perspective view of the connecting member of the basket according to the first embodiment.
Figure 9B:
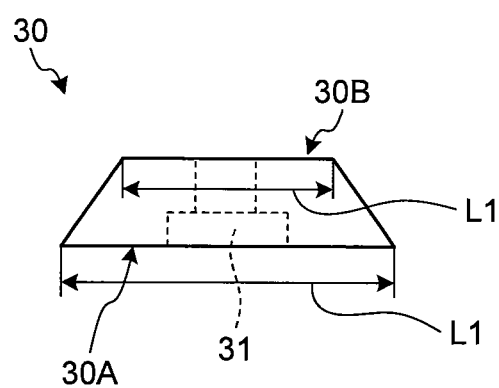
FIG. 9B is a front view of the connecting member of the basket according to the first embodiment.

FIG. 3 is a perspective view of the basket according to the first embodiment. FIG. 4 is a sectional view of a portion in which the connecting members are attached to the first plate member in the basket according to the first embodiment. FIG. 5 is an enlarged partial view of the basket according to the first embodiment. FIG. 6A is a side elevation view of the first plate member of the basket according to the first embodiment. FIG. 6B is a front view of the first plate member of the basket according to the first embodiment. FIG. 7 is a front view of a modification of the first plate member of the basket according to the first embodiment. FIGS. 6C to 6E are front views of modifications of the first plate member of the basket according to the first embodiment. FIG. 8A is a side elevation view of the second plate member of the basket according to the first embodiment. FIG. 8B is a front view of the second plate member of the basket according to the first embodiment. FIG. 9A is a perspective view of the connecting member of the basket according to the first embodiment. FIG. 9B is a front view of the connecting member of the basket according to the first embodiment.

The basket 1 is formed by combining a first plate member 10, a second plate member 20, and a connecting member 30. As illustrated in FIGS. 6A and 6B, the first plate member 10 is a rectangular shaped member when viewed from the side, and has four ends. When viewed from the side, two ends corresponding to the long sides of the first plate member 10 are long side ends 10LT1 and 10LT2, and when viewed from the side, two ends corresponding to the short sides of the first plate member 10 are short side ends 10ST. A protruded portion (ridge) 11 extending in the longitudinal direction of the first plate member 10 is provided on the long side end 10LT1, and a groove 12 fitted with the protruded portion 11 extending in the longitudinal direction of the first plate member 10 is provided at the long side end 10LT2.

The long side end 10LT2 has legs 15 that are two protruded portions extending in the longitudinal direction of the first plate member, and a portion surrounded by the legs 15 is the groove 12. As illustrated in FIG. 3, when the first plate members are stacked with the long side ends 10LT1 and 10LT2 thereof abutting to each other, the protruded portion 11 of the long side end 10LT1 is fitted into the groove 12 of the long side end 10LT2. At this time, the legs 15 of the long side end 10LT2 are brought into contact with shoulders 11a of the long side end 10LT1.

Screw holes 10H for attaching the connecting member 30 with bolts 40 that are fastening members for attaching the first plate member 10 to the connecting member 30, are provided at a side surface 10S of the first plate member. The first plate member 10 also has a through hole 13 extending in the longitudinal direction. In the present embodiment, two through holes 13 are provided in the first plate member 10. The two through holes 13 are partitioned by a partition portion (rib) 14 included in the first plate member 10. In this manner, the strength of the first plate member 10 is increased in the thickness direction of the first plate member 10, in other words, in the direction perpendicular to the side surface 10S of the first plate member 10. The through hole 13 also acts as a neutron flux trap.

As modifications of the first plate member, a first plate member 10A illustrated in FIG. 6C has one through hole 13A, and a first plate member 10B illustrated in FIG. 6D has three through holes 13B. As a first plate member 10C illustrated in FIG. 6E, grooves 12C may be provided at both long side ends, and the first plate members 10C may be stacked by interposing a member 11C that can fill the adjacent grooves 12C therebetween.

As illustrated in FIG. 7, a reinforcement member 50 may be disposed in the through hole 13 of the first plate member 10. The reinforcement member 50 is made of a material having higher stiffness than that of the first plate member 10, and the length of the reinforcement member 50 (size in the longitudinal direction of the reinforcement member 50) is substantially the same as the entire length of the through hole 13. In this manner, by disposing the reinforcement member 50 having higher stiffness than that of the first plate member 10 in the through hole 13, the strength against the bending of the first plate member 10 is further enhanced. For example, if an aluminum material containing boron, which will be described later, is used for the first plate member 10, stainless is used for the reinforcement member 50. A hollow reinforcement member 50a having a through hole penetrating in the longitudinal direction may also be used, enabling to act as a flux trap. The mass of the basket 1 can be prevented from being increased, for example, by inserting the reinforcement member 50 or the reinforcement member 50a only at positions where the grids of the recycled fuel assemblies come in contact at a certain interval, and placing only the first plate member 10 at the other portions.

As illustrated in FIGS. 8A and 8B, similar to the first plate member 10 described above, the second plate member 20 is a rectangular shaped member when viewed from the side, and has four ends. When viewed from the side, two ends corresponding to the long sides of the second plate member 20 are long side ends 20LT, and when viewed from the side, two ends corresponding to the short sides of the second plate member 20 are short side ends 20ST. Recesses 21 extending in the longitudinal direction of the second plate member 20 are provided at the long side ends 20LT. The recesses 21 are fitted into the connecting members 30 attached to the side surfaces 10S of the first plate members 10.

The second plate member 20 has a through hole 23 extending in the longitudinal direction. In the present embodiment, two through holes 23 are provided in the second plate member 20. The two through holes 23 are partitioned by a partition portion (rib) 24 included in the second plate member 20. In this manner, the strength of the second plate member 20 in the thickness direction of the second plate member 20, in other words, in the direction perpendicular to a side surface 20S of the second plate member 20 is increased. The through hole 23 also acts as a neutron flux trap.

As illustrated in FIG. 3, in a state in which plate member joint bodies (barriers) 100 formed by stacking the first plate members 10 in a plurality of stages and being connected with the connecting members 30 are disposed so as to face each other, and the connecting members 30 are placed opposite from each other, the corresponding connecting members 30 are inserted into both recesses 21 of the second plate member 20. Each of the recesses 21 is a dovetail groove and has a shape that spreads towards the inside of the recess 21 from a groove opening 21H illustrated in FIG. 8B, in other words, towards the through hole 23 of the second plate member 20. In this manner, the recess 21 is meshed with the connecting member 30 whose cross-section is trapezoid, thereby preventing the second plate member 20 from being disengaged from the connecting member 30. The second plate member 20 also functions to connect the adjacent plate member joint bodies 100.

In this dovetail groove coupling structure, the first plate member 10 can be placed at any position. Accordingly, cells can be stacked at different positions, which was not possible in the conventional structure (such as FIGS. 21 to 23 in Japanese Patent Application Laid-open No. 2001-166089). In the conventional structure (such as FIGS. 21 to 23 in Japanese Patent Application Laid-open No. 2001-166089), many joint portions are present from the center to the outer peripheral surface of the basket. Accordingly, the heat transfer from the center region to the outer periphery of the basket may be obstructed. However, in the dovetail groove coupling structure of the basket 1 illustrated in FIG. 3, the first plate member 10 is formed of one plate member from the center to the outer peripheral surface of the basket 1. Accordingly, the heat transfer from the center region to the outer periphery of the basket 1 can be facilitated.

In another conventional structure (such as FIG. 22 in Japanese Patent Application Laid-open No. 2004-069620), if cells are stacked at different positions, the connection surfaces of the plate members become small. Accordingly, the heat transfer from the center region to the outer periphery of the basket is not easy. Even if the plate members are aligned and stacked, many joint portions are present from the center to the outer peripheral surface of the basket. Accordingly, the heat transfer from the center region to the outer periphery of the basket may be obstructed. In the dovetail groove coupling structure of the basket 1 illustrated in FIG. 3, a half of the first plate members 10 and the second plate members 20 that form the cells, is formed by one first plate member 10 from the center region to the outer peripheral surface of the basket 1. Accordingly, the heat transfer from the center region, to the outer periphery of the basket 1 can be facilitated.

In still another conventional structure (such as FIG. 2 in Japanese Patent Application Laid-open No. 2004-020568), cells can be stacked at different positions. However, because recesses are formed in the elements as engagement portions, the depth of the recesses is removed from the thickness of the plate. As a result, the heat transfer area is reduced, thereby reducing the mechanical stiffness. On contrary, in the dovetail groove coupling structure of the basket 1 illustrated in FIG. 3, a large recess (such as deep notch or large notch) is not provided at the first plate member 10 or the second plate member 20. Consequently, the heat transfer performance and the mechanical stiffness can be improved.

The first plate member 10 and the second plate member 20, to secure a subcritical function and to reduce weight, are manufactured of an aluminum (Al) material containing boron ($B^{10}$) (hereinafter, "boron-aluminum material") (the same applies hereinafter). Boron may also be a boron compound such as boron carbide ($B_4C$). The first plate member 10 and the second plate member 20, for example, can be manufactured by hot rolling or hot extruding a billet made of boron-aluminum manufactured by powder metallurgy.

If materials of the same type are rubbed with each other, material loss may occur due to galling. While a material for the connecting member 30 is not especially specified in the present embodiment, at least the surface of the connecting member 30 that comes into contact with the second plate member 20 is preferably made of a material different from that of the second plate member 20 (different characteristics from those of the second plate member 20 can be achieved to prevent galling by performing oxidation treatment, thermal spraying, plating, or other surface treatment; by coating the surface with a lubricating layer represented by graphite and the like; or by using the surface treatment and the lubricating layer in combination). Both of the surface and the inside of the connecting member 30 are preferably made of a material different from that of the second plate member 20, thereby preventing galling.

Examples of methods for adopting a different material may include using the same base material and performing oxidation treatment, thermal spraying, plating, or other surface treatment to make only the surface have different characteristics from those of the second plate member to prevent galling; coating the surface of the second plate member or the connecting member with a lubricating layer represented by graphite and the like; using the surface treatment coating and the lubricating layer coating in combination; and using a material having relatively higher strength and higher hardness (stainless, carbon steel, titanium, or the like) than the strength and hardness of the second plate member for the base material of the connecting member. As a different material, a material softer than the second plate member may be chosen for the connecting member. In this case, to receive the load in a dispersed manner, the number of connecting members must be increased or the size of the connecting member must be enlarged. Accordingly, this is not suitable for the purpose of producing an inexpensive recycled fuel assembly storage basket. However, as a basket exclusively used as a storage container, if the assumed load is lighter than that of the transportation-storage container, a soft material may be possibly chosen for the connecting member.

In this manner, the galling that occurs by forming the second plate member 20 and the connecting member 30 with materials of the same type (in other words, materials having similar hardness) can be prevented, thereby preventing material loss on the second plate member 20 and the connecting member 30. In the present embodiment, the connecting member 30 is made of, for example, stainless steel, copper, copper alloy, high strength aluminum alloy whose surface is hardened, or a metal (alloy) obtained by combining the surface treatment and the lubricating layer coat. For example, a dovetail groove may be formed in the side surface 10S of the first plate member 10, so that both ends of the second plate member 20 are fitted into the dovetail groove. However, because materials of the same type are used for the first plate member 10 and the second plate member 20 in the present embodiment, material loss may occur due to galling between the first plate member 10 and the second plate member 20 in such a structure. However, in the structure of the present embodiment, a portion where galling between the materials may occur, in other words, a portion where the connecting member 30 and the second plate member 20 are fitted to each other, can be easily made of different materials. Consequently, it is possible to prevent galling.

As illustrated in FIGS. 9A and 9B, the connecting member 30 has first side surfaces 30A and second side surfaces 30B parallel to each other, and the cross-section of the connecting member 30 perpendicular to the longitudinal direction is a trapezoidal shape. The second side surface 30B, in other words, a size L1 of the upper base side is shorter than the first side surface 30A, in other words, a size L2 of the lower base side. The upper base of the cross-section, in other words, the side of the second side surface 30B comes into contact with the side surface 10S of the first plate member 10 illustrated in FIGS. 3 and 6A, for example. In other words, the second side surface 30B of the connecting member 30 comes into contact with the first plate member 10.

A bolt through hole 31, through which the bolt 40 is penetrated, is formed in the first side surface 30A. The bolt through hole 31 is a long hole to which spot facing is performed. In this manner, as illustrated in FIG. 4, if the connecting member 30 is fastened and attached to the first plate member 10 by having the bolt 40 penetrated through the bolt through hole 31, the head of the bolt 40 is hidden in the bolt through hole 31, thereby preventing the head of the bolt 40 from being projecting from the first side surface 30A of the connecting member 30.

By making the bolt through hole 31 into a long hole, the connecting member 30 is movable relative to the bolt 40. Accordingly, the connecting member 30 and the first plate member 10 are relatively movable. As a result, it is possible to relieve the thermal stress generated due to difference in thermal elongation, caused when the material of the connecting member 30 and the material of the first plate member 10 are different. The positions of the first plate member 10 and the connecting member 30 may be defined, by forming a specific hole to which the bolt 40 is attached into a simple round hole, instead of the long hole. In this case, the thermal stress generated in the connecting member 30 due to thermal elongation of the first plate member 10 can be reduced than when all the holes are made into long holes, by making the position to which the bolt 40 is attached to approximately a half of the entire length of the connecting member 30.

Figure 10A:
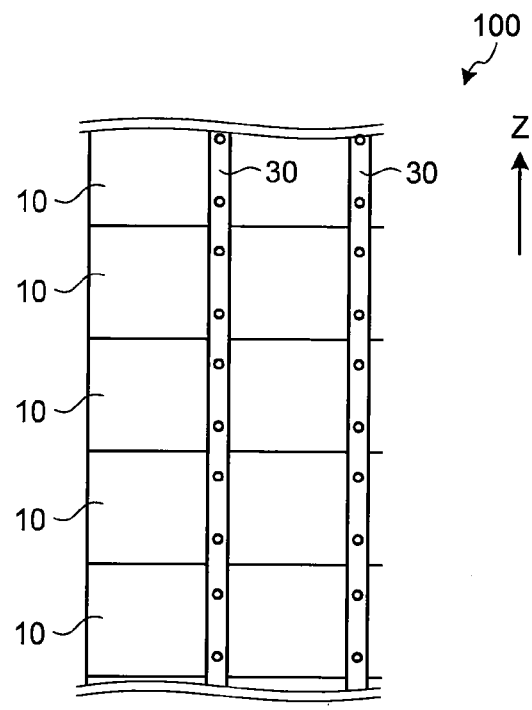
FIG. 10A is a schematic for explaining a plate member joint body obtained by stacking the first plate members and connecting them with the connecting members.
Figure 10B:
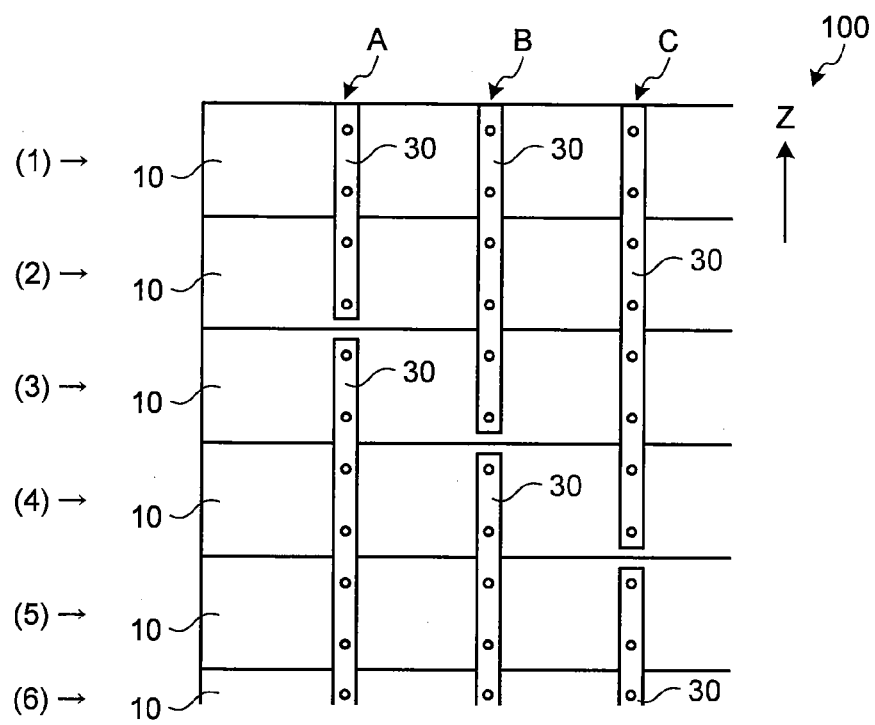
FIG. 10B is a schematic for explaining the plate member joint body obtained by stacking the first plate members and connecting them with the connecting members.
Figure 10C:
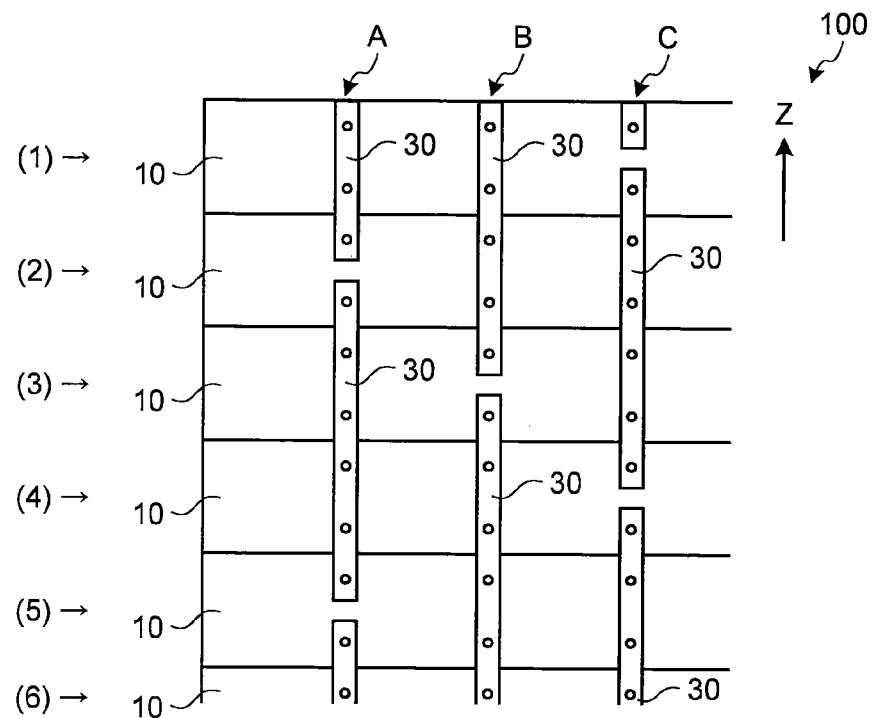
FIG. 10C is a schematic for explaining the plate member joint body obtained by stacking the first plate members and connecting them with the connecting members.
Figure 10D:
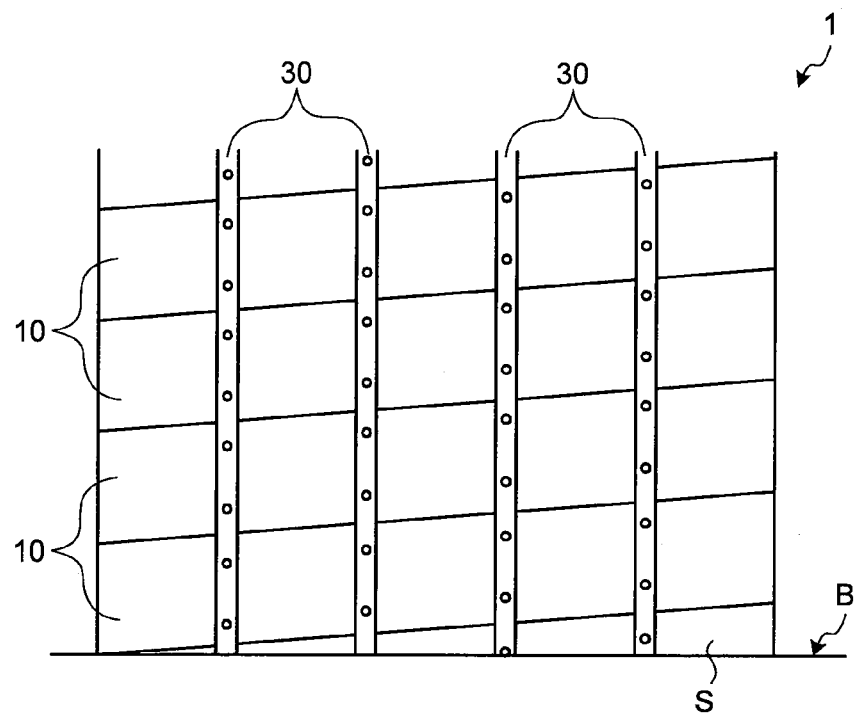
FIG. 10D is a schematic for explaining another example of the plate member joint body.

FIGS. 10A, 10B, and 10C are schematics for explaining a plate member joint body obtained by stacking the first plate members and connecting them with the connecting members. FIG. 10D is a schematic for explaining another example of the plate member joint body. The plate member joint body 100 is integrally formed by connecting the first plate members 10, by stacking the first plate members 10 with the long side ends thereof abutting to each other, and attaching the connecting members 30 to the side surfaces of the first plate members 10. At this time, as illustrated in FIGS. 1 and 5, the connecting members 30 project out from the side surfaces 10S of the first plate members 10. The connecting members 30 are attached in the longitudinal direction of the first plate member 10 at a predetermined interval. In this manner, the second plate member 20 disposed between the plate member joint bodies 100 is disposed in a predetermined interval. The direction towards which the first plate members 10 are stacked is the direction of the cavity axis Z.

In the plate member joint body 100 illustrated in FIG. 10A, the sizes of the connecting members 30 in the longitudinal direction are substantially equal to the entire length in the direction towards which the first plate members 10 are stacked. Accordingly, a prior stage of the plate member joint body 100 formed by stacking the first plate members 10 in a plurality of stages is connected by one connecting member 30.

In the plate member joint body 100 illustrated in FIG. 10B, the sizes of the connecting members 30 in the longitudinal direction are shorter than the entire length in the direction towards which the first plate members 10 are stacked. In other words, the connecting members 30 are divided at different positions in the direction towards which the first plate members 10 are stacked. This means that the connecting members 30 are divided at different stages of the first plate members 10 being stacked in a plurality of stages. For example, the connecting member 30 at the position A in FIG. 10B is divided between the stage (2) and the stage (3), the connecting member 30 at the position B is divided between the stage (3) and the stage (4), and the connecting member 30 at the position C is divided between the stage (4) and the stage (5). In this manner, by dividing the connecting members 30 at different positions towards which the first plate members 10 are stacked, in other words, by dividing the connecting members 30 at different positions in the longitudinal direction of the connecting member 30, the entire length of the connecting member 30, in other words, the size in the longitudinal direction can be reduced. Accordingly, the effects due to difference in thermal elongation, caused when the material of the connecting member 30 and the material of the first plate member 10 are different, can be relieved. In consideration of common use of parts, the number of parts can be reduced, if the connecting members 30 are divided into lengths of connecting two stages, three stages, and four stages of the first plate members 10. However, if a difference in thermal elongation between the first plate member 10 and the connecting member 30 is small, the number of stages may be increased (for example, from four stages to six stages). As illustrated in FIG. 10C, it is preferable to divide the connecting members 30 at the center of the first plate members 10 in the direction of the cavity axis Z, because all the connecting members can contribute to connecting the first plate members 10.

As illustrated in FIG. 10D, a plate member joint body 100a may be formed by inclining the long side ends of the first plate members 10 relative to a bottom B of the cavity 201C (FIGS. 1 and 2), and connecting them with the connecting members 30. In this case, a spacer S having an inclined surface is disposed between the plate member joint body 100a and the bottom B. This is preferable, because water from the through hole 13 (refer to FIG. 6B) formed in the inside of the first plate member 10 can be easily drained.

The basket 1 illustrated in FIG. 3, for example, is assembled and manufactured by the following procedures. First, the first plate members 10 are stacked, by fitting the groove 12 and the protruded portion 11 of the long side ends 10LT1 and 10LT2 to each other. The plate member joint bodies 100 (barriers) are then formed in plurality by attaching the connecting members 30 at the side surfaces 10S of the first plate members 10, and connecting the first plate members 10. At this time, the connecting members 30 are projecting from the side surfaces 10S of the first plate members 10. As illustrated in FIGS. 3 and 4, the connecting members 30 are attached to the first plate members 10 by using the bolts 40.

The side surfaces of the plate member joint bodies 100 are disposed so as to face each other, and the connecting members 30 are placed opposite from each other. The connecting members 30 placed opposite from each other are inserted into the recesses 21 formed in both of the long side ends 20LT of the second plate member 20. When the connecting members 30 are inserted into the recesses 21, as illustrated in FIG. 5, the recesses 21 of the second plate member 20 and the connecting members 30 are meshed with each other. Accordingly, the second plate member 20 is prevented from being disengaged from the connecting members 30. Accordingly, the basket 1 can be easily assembled, and it is possible to prevent a deviation from occurring between the plate member joint bodies 100 and the second plate members 20. By using such a procedure, the basket 1 can be assembled. Spaces surrounded by the plate member joint bodies 100 and the second plate members 20 are cells in which the recycled fuel assemblies are stored. In the basket 1 assembled in this manner, only the screw holes 10H are formed in the side surface 10S of the first plate member 10, and the second plate member 20 is not inserted by forming a groove thereto. Consequently, the risk of losing stiffness of the first plate member 10 can be reduced to a minimum. In this manner, the integrity of the basket 1 can be sufficiently secured.

In the basket 1 illustrated in FIG. 3, the first plate member 10 and the second plate member 20 are made of a boron-aluminum material having neutron absorbing power. However, the first plate member 10 and the second plate member 20 may be made of normal aluminum alloy or stainless steel that does not have neutron absorbing power. In this case, a material (a boron plate and a plate made of stainless-steel containing boron, for example) having neutron absorbing power is separately disposed at the inner surfaces of the cells and on the side surfaces of the plate members facing each other.

Figure 11A:
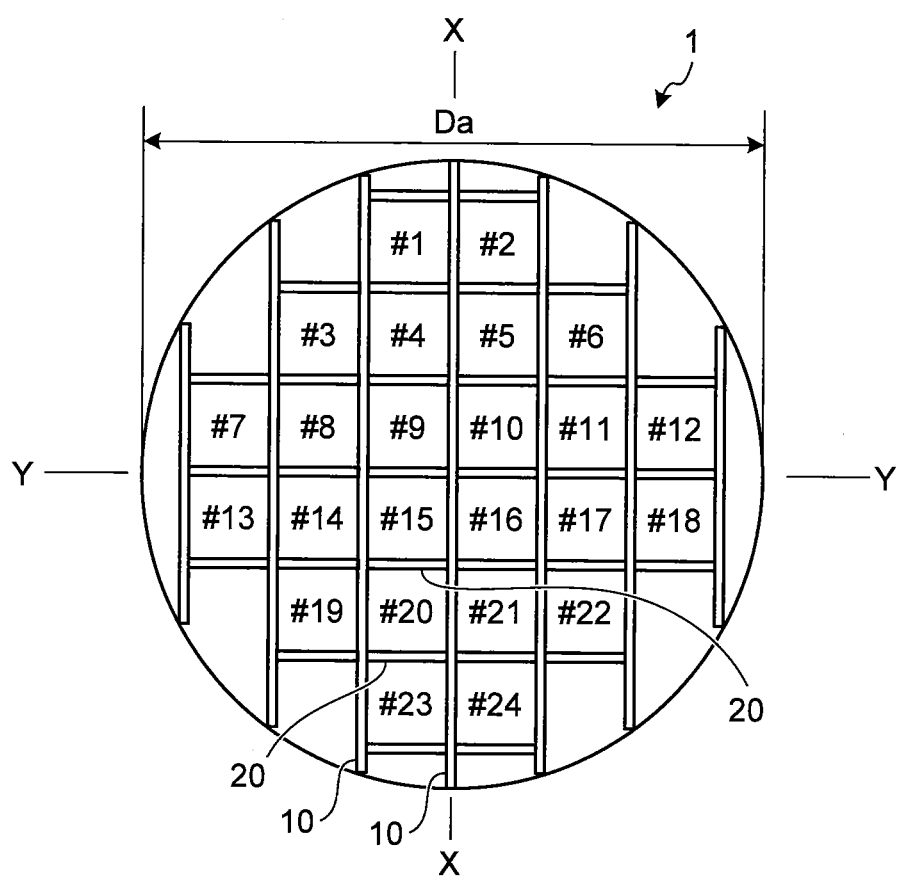
FIG. 11A is a plan view of the basket according to the first embodiment.
Figure 11B:
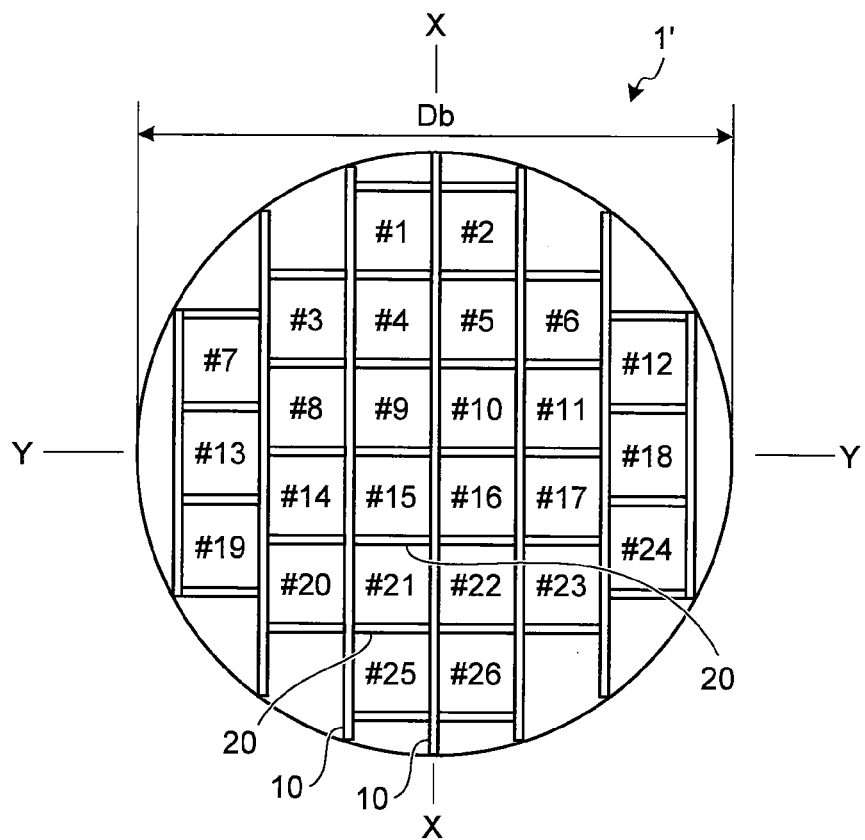
FIG. 11B is a plan view of the basket according to the first embodiment.

FIGS. 11A and 11B are plan views of the basket according to the first embodiment. The basket 1 illustrated in FIG. 11A includes 24 pieces of cells surrounded by the first plate members 10 and the second plate members 20, and stores the recycled fuel assemblies therein. #1 to #24 indicate the cells. In the basket 1, a cell column is formed by aligning a plurality of cells in the longitudinal direction of the first plate member 10. The adjacent cell columns do not deviate from each other.

A basket 1' illustrated in FIG. 11B includes 26 pieces of cells surrounded by the first plate members 10 and the second plate members 20, and stores the recycled fuel assemblies therein. #1 to #26 indicate the cells. In the basket 1', a cell column is formed by aligning a plurality of cells in the longitudinal direction of the first plate member 10. The cell columns adjacent to each other in the direction from the center region to the outside, are deviated as much as a half of the alignment pitch of the cell. In the basket disclosed in Patent document 1, such cell alignment is not possible. However, in the present embodiment, the basket 1' is formed by combining the first plate members 10 and the second plate members 20, thereby allowing such cell alignment. If the cells are aligned in this manner, even if an outer diameter Da of the basket 1 and an outer diameter Db of the basket 1' are the same, the number of cells can be increased. In the basket 1' illustrated in FIG. 11B, the adjacent cell columns are disposed at positions deviated from each other. Accordingly, compared with a basket in which deviations are not allowed, more number of recycled fuel assemblies can be stored therein. Consequently, it is possible to take advantages of this structure.

For example, if the cask 200 illustrated in FIGS. 1 and 2 falls in the Y direction, the load of the recycled fuel assemblies stored in the cells is transmitted to the second plate member 20, and then transmitted to the first plate member 10 from the connecting member 30 through the bolts 40. At this time, a piece of the second plate member 20 and the pair of connecting members 30 only receive the load of one of the recycled fuel assemblies. Accordingly, the integrity of the basket 1 can be readily secured. If the basket 1' illustrated in FIG. 11B falls in the Y direction, because the first plate member 10 does not have a notch as large as a half of the member (see the plate member in Patent Document 1), the basket 1' can be assembled without impairing the original strength of the first plate member 10. Even if the size and the thickness of the first plate member 10 according to the present embodiment are the same as those of the plate member in Patent Document 1, because the first plate member 10 does not have a notch as large as a half of the plate member, the strength of the first plate member 10 is approximately twice as much as that of the plate member in Patent Document 1, thereby corresponding to the load.

If the basket 1' illustrated in FIG. 11B falls in the X direction, the load of the second plate member 20 applied to the side surface of the first plate member 10 must be taken into account. However, because the first plate member 10 does not have a notch as large as a half of the member (see the plate member in Patent Document 1), the first plate member 10 can sufficiently endure the load of the second plate member 20 and the recycled fuel assemblies trying to bend the first plate member 10. Accordingly, the load is effectively dispersed. Even if the size and the thickness of the first plate member 10 according to the present embodiment are the same as those of the plate member in Patent Document 1, because the first plate member 10 does not have a notch as large as a half of the member, the strength of the first plate member 10 is approximately twice as much as that of the plate member in Patent Document 1, thereby corresponding to the load in the X direction. As a result, the integrity of the basket 1 can be secured. Depending on the needs, as illustrated in FIG. 7, the entire strength of the first plate member 10 can be improved, by disposing the reinforcement member 50 in the through hole 13 of the first plate member 10. Accordingly, the integrity of the basket 1 can further be secured without fail.

The first plate member 10 of the basket 1 is disposed so as to intersect the direction parallel to the radial direction (radial direction of the cavity 200C illustrated in FIG. 2) of the baskets 1 and 1'. Accordingly, the first plate member 10 has very good heat transfer characteristics. As a result, the heat transfer characteristics in the entire baskets 1 and 1' can be sufficiently secured. A material having a high thermal conductivity, for example, a heat transfer accelerating layer made of a metal paste such as a silver paste or a copper paste, or a carbon paste may be inserted between the recess 21 of the second plate member 20 and the connecting member 30. In this manner, the heat transfer performance between the second plate member 20 and the first plate member 10 is improved, thereby further improving the heat transfer characteristics of the entire baskets 1 and 1'. This heat transfer accelerating layer made of a metal paste such as a silver paste or a copper paste, or a carbon paste, can eliminate the risk of material loss due to galling that occurs when the second plate member 20 is assembled to the basket 1. Accordingly, it is preferable to form such a heat transfer accelerating layer.

Figure 11C:
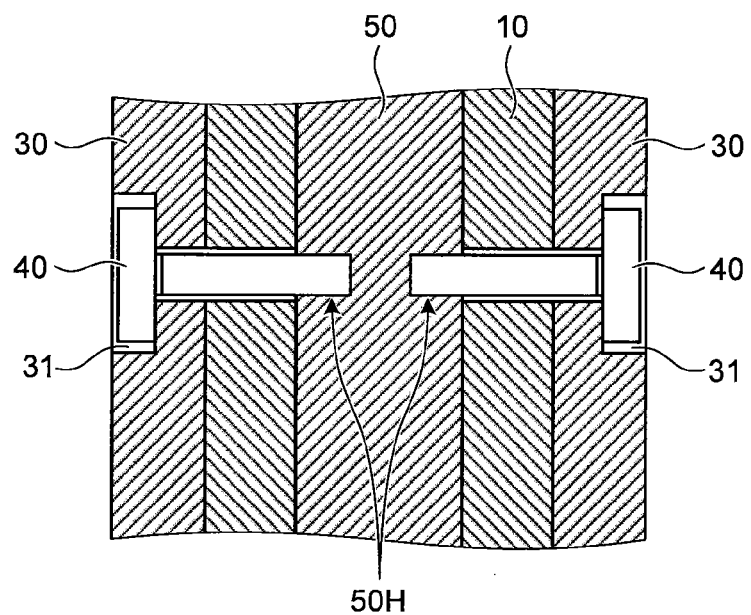
FIG. 11C is a schematic for explaining a modification of an attachment structure of the connecting members and the first plate member according to the first embodiment.

FIG. 11C is a schematic for explaining a modification of an attachment structure of the connecting member and the first plate member. This attachment structure is an attachment structure between the connecting member 30 and the first plate member 10, when the reinforcement member 50 is disposed in the through hole 13 of the first plate member 10 illustrated in FIG. 7. In the attachment structure, screw holes 50H into which the bolts 40 are screwed, are formed in the reinforcement member 50. The connecting member 30 is attached to the first plate member 10, by screwing the bolt 40 that has passed through the bolt through hole 31 of the connecting member 30 into the screw hole 50H. In this attachment structure, a nut for connecting with the bolt 40 is not required, thereby reducing the number of parts. In FIG. 11C, the screw holes in the reinforcement member 50 are expressed by the bolts 40. However, it is easier to form a screw hole, if the screw hole 50H is penetrated through the reinforcement member 50. Nevertheless, as illustrated in FIG. 11B, if cell columns are provided at positions deviated from the adjacent cell column, the screw hole 50H does not have to penetrate through the reinforcement member 50.

In the present embodiment, the first plate members are stacked with the long side ends thereof abutting to each other, and the connecting members are attached to the side surfaces of the stacked first plate members, thereby connecting the first plate members. The basket is formed by inserting the connecting member projecting from the side surfaces of the first plate members into recesses formed at both long side ends of the second plate member. In this manner, for example, upon manufacturing the first plate members, the second plate members, and the connecting members of the basket by extrusion molding, the basket can be assembled by performing a simple process of punching and the sort on the first plate members, the second plate members, and the connecting members. As a result, the number of cutting processes on the members of the basket can be drastically reduced. Accordingly, even if the members of the basket are made of difficult-to-cut materials such as a boron-aluminum material, it is possible to manufacture the basket relatively easily, and save the waste of materials resulting from the cutting process. Consequently, it is possible to reduce processing costs.

Second Embodiment

A structure of a second embodiment is substantially the same as that of the first embodiment. However, the second embodiment is different from the first embodiment in providing a load supporting unit that supports the load of the second plate member, in other words, the load in the direction perpendicular to the longitudinal direction of the connecting member between the fastening member and the connecting member, and between the fastening member and the first plate member. Other structures are the same as those in the first embodiment.

Figure 12:
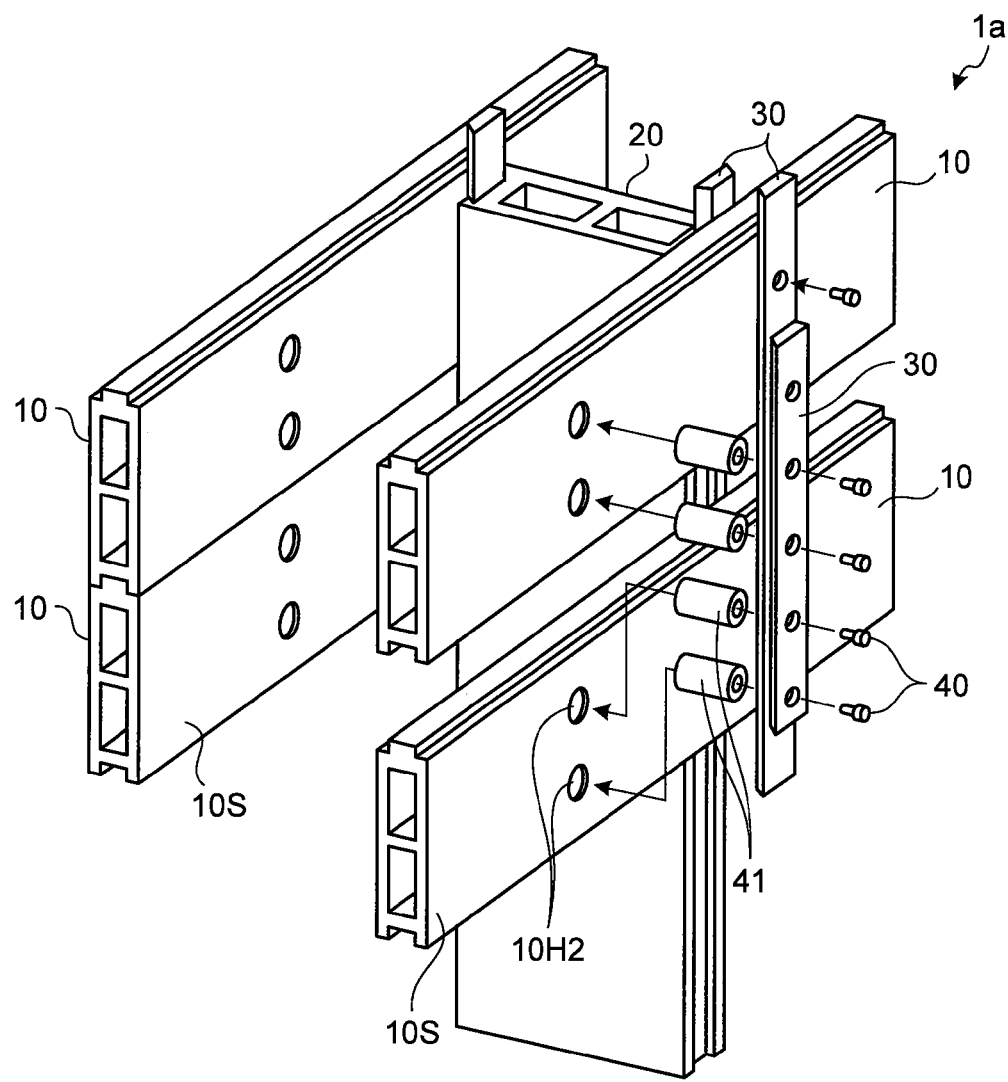
FIG. 12 is a perspective view of a basket according to a second embodiment.
Figure 13:
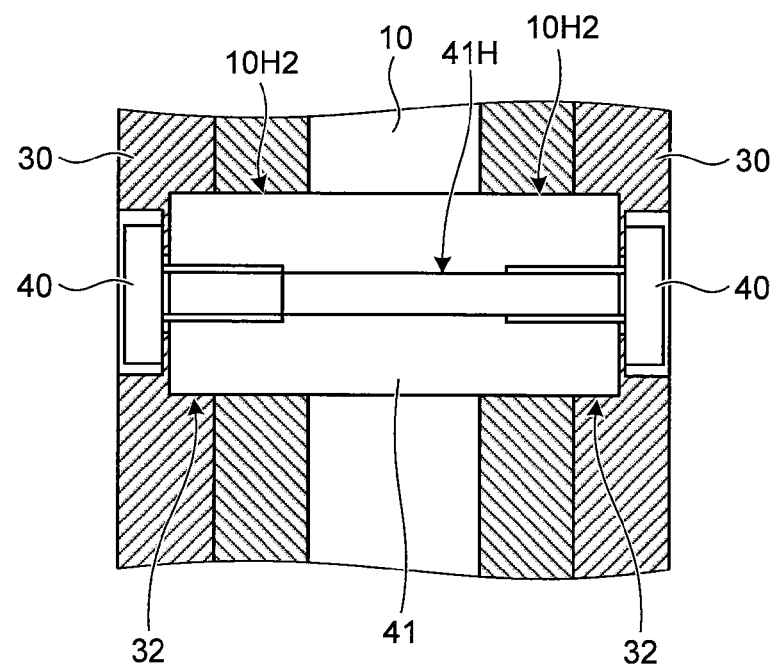
FIG. 13 is a sectional view of a portion in which connecting members are attached to a first plate member in the basket according to the second embodiment.
Figure 14:
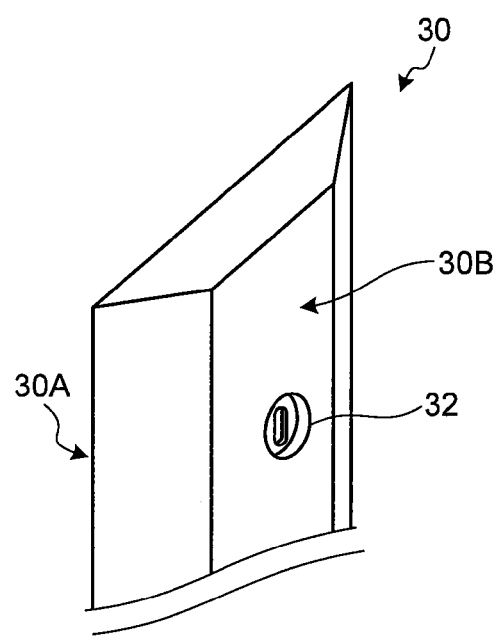
FIG. 14 is a perspective view of the connecting member of the basket according to the second embodiment.

FIG. 12 is a perspective view of a basket according to the second embodiment. FIG. 13 is a sectional view of a portion in which a connecting member is attached to the first plate member in the basket according to the second embodiment. FIG. 14 is a perspective view of the connecting member of the basket according to the second embodiment. As illustrated in FIGS. 12 and 13, a load supporting key 41 that is a load supporting unit is provided between the bolt 40 that is a fastening member and the connecting member 30, and between the bolt 40 and the first plate member 10. The load supporting key 41 is a cylindrical member and has a through hole 41H penetrated in the longitudinal direction. Screw holes in which the bolts 40 are screwed are formed at the both ends of the through hole 41H. In this manner, the outer diameter of the load supporting key 41 is larger than the outer diameter of the bolt 40. The material of the load supporting key 41 may be the same as that of the connecting member 30, or may be different from that of the connecting member 30. In the present embodiment, the load supporting key 41 is made of stainless steel that is the same material as that of the connecting member 30. However, the connecting member 30 is not limited to stainless steel, but a material having high strength that can receive a large load by a small area can also be applied, thereby obtaining the effects of the second embodiment.

As illustrated in FIG. 14, a key receiving recess 32 into which the load supporting key 41 is fitted is provided at the second side surface 30B of the connecting member 30. A portion of the key receiving recess 32 into which the load supporting key 41 is fitted, is matched with the outer shape of the load supporting key 41. In the present embodiment, the shape of the load supporting key 41 is circular. In other words, because the shape of the outer cross-section perpendicular to the longitudinal direction of the load supporting key 41 is circular, the inner shape of the key receiving recess 32 is also circular. If the shape of the outer cross-section perpendicular to the longitudinal direction of the load supporting key 41 is rectangular, the inner shape of the key receiving recess 32 will be rectangular. In this manner, the rotation of the load supporting key 41 is suppressed when the bolt 40 is screwed in, thereby facilitating the work. The load of the second plate member 20 transmitted through the connecting member 30 is transmitted to the load supporting key 41 without fail.

A key through hole 10H2, through which the load supporting key 41 is penetrated, is formed in the first plate member 10. The shape of the key through hole 10H2 is matched with the outer shape of the load supporting key 41. In the present embodiment, the shape of the outer cross-section perpendicular to the longitudinal direction of the load supporting key 41 is circular. Accordingly, the inner shape of the key through hole 10H2 is also circular. If the shape of the outer cross-section perpendicular to the longitudinal direction of the load supporting key 41 is rectangular, the inner shape of the key through hole 10H2 will be rectangular. In this manner, the load of the second plate member 20 transmitted to the load supporting key 41 is transmitted to the first plate member 10 without fail.

To fix the connecting member 30 to the side surface 10S of the first plate member 10, the load supporting key 41 is inserted into the key through hole 10H2 formed in the first plate member 10, thereby coupling the load supporting key 41 and the first plate member 10. The end of the load supporting key 41 projecting from the side surface 10S of the first plate member 10 is fitted into the key receiving recess 32 of the connecting member 30, thereby coupling the connecting member 30 and the load supporting key 41. The bolts 40 are then screwed into the screw holes formed at both ends of the load supporting key 41, thereby attaching the connecting member 30 to the side surface 10S of the first plate member 10 with the bolts 40. The screw holes formed at the load supporting key 41 may only be formed at both ends. However, if the screw hole is formed into a through screw hole from one side, the processing may only be performed from one side, thereby improving the workability in assembling the basket. Upon confirming the presence of a foreign matter in the screw hole formed at the load supporting key 41, if the screw hole is formed into the through screw hole, the screw hole can be seen through. Accordingly, it is possible to visually confirm the presence of a foreign manner with ease, thereby improving the workability in assembling the basket.

If the connecting member 30 is attached to the first plate member 10 only with the bolts 40, the entire load of the second plate member 20 must be received by the bolts 40. Accordingly, the diameter of the bolts 40 must be increased. However, the width of the connecting member 30, in other words, the size in the direction perpendicular to the longitudinal direction of the connecting member 30 needs to be smaller than the thickness of the second plate member 20. Consequently, there is a limitation in increasing the diameter of the bolts 40. In this case, the load can be received by increasing the number of bolts 40, but if this method is used, an operation of forming screw holes for a large number of bolts 40 and an operation of screwing a large number of bolts 40 into the screw holes are increased.

In a basket 1a according to the second embodiment, the load of the second plate member 20 is received by the load supporting key 41 having a larger outer diameter than that of the bolt 40. Accordingly, an area of receiving the load can be increased. In this manner, even if the number of load supporting keys 41 is reduced, the load can be received without fail. Because the number of bolts 40 can be reduced, the operation of forming screw holes for the bolts 40 and the operation of screwing a large number of bolts 40 into the screw holes can be reduced.

Figure 15:
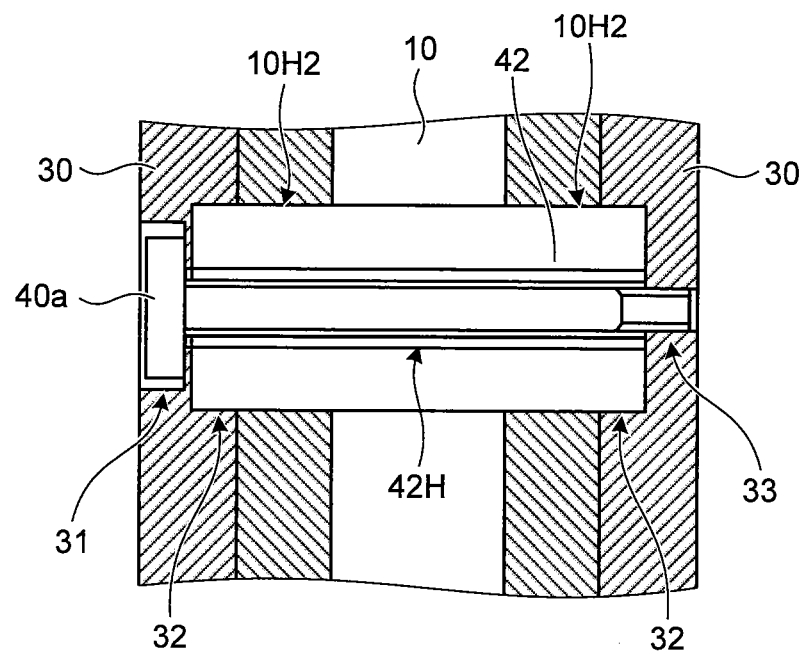
FIG. 15 is a sectional view of another structure of the portion in which the connecting members are attached to the first plate member in the basket according to the second embodiment.
Figure 16:
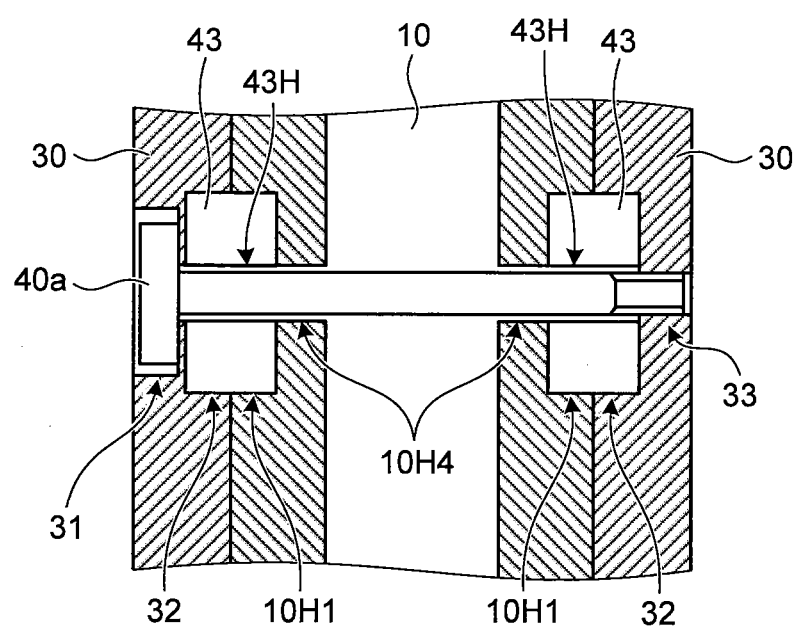
FIG. 16 is a sectional view of another structure of the portion in which the connecting members are attached to the first plate member in the basket according to the second embodiment.
Figure 17:
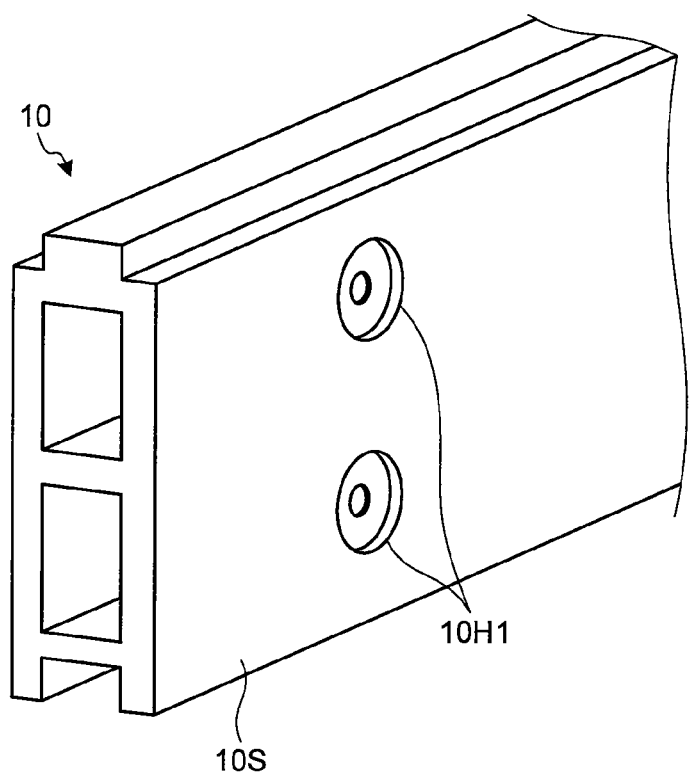
FIG. 17 is a perspective view of the first plate member used in the structure illustrated in FIG. 16.

FIGS. 15 and 16 are sectional views of other structures of the portion in which the connecting members are attached to the first plate member in the basket according to the second embodiment. FIG. 17 is a perspective view of the first plate member used in the structure illustrated in FIG. 16. In the structure illustrated in FIG. 15, a bolt through hole 42H, through which a bolt 40a is penetrated, is provided in a cylindrical load supporting key 42. The bolt through hole 31 is provided at one of the connecting members 30 attached to both side surfaces of a piece of the first plate member 10, and a bolt screw hole 33 is provided at the other connecting member 30. The length of the bolt 40a extends from one of the connecting members 30 to the other connecting member 30 through the first plate member 10.

To attach the connecting members 30 to the first plate member 10, the load supporting key 42 is inserted into the key through hole 10H2 formed in the first plate member 10, thereby coupling the load supporting key 42 and the first plate member 10. The key receiving recess 32 of the connecting member 30 is fitted into the end of the load supporting key 42 projecting from the side surface of the first plate member 10, thereby coupling the connecting member 30 and the load supporting key 42. The bolt 40a is passed through the bolt through hole 31 provided at one of the connecting members 30, and inserted into the bolt through hole 42H of the load supporting key 42. The bolt 40a is then screwed into the bolt screw hole 33 provided at the other connecting member 30, thereby attaching the connecting member 30 to the first plate member 10 with the bolt 40a. In this structure, screw holes need not be formed at both ends of the load supporting key 42, thereby reducing the number of processes of forming the screw holes as much.

A structure illustrated in FIG. 16 is similar to the structure in FIG. 15. However, the structure in FIG. 16 is different from that in FIG. 15 in using a plate-like load supporting key 43 to which a bolt through hole 43H, though which the bolt 40a is passed, is formed. The load supporting key 43 does not penetrate through the first plate member 10, but coupled with the first plate member 10 by being inserted into a key receiving recess 10H1 (see FIGS. 16 and 17) formed at the side surface 10S of the first plate member 10, in other words, the side of the connecting member 30. In this example, the load supporting key 43 is formed in a disk shape, or more specifically, formed in a donut shape. However, the load supporting key 43 may be formed in a non-circular shape such as an oval. An area required for receiving the load may be secured by forming the load supporting key 43 into a rectangular plate shape.

To attach the connecting member 30 to the first plate member 10, the load supporting key 43 is fitted into the key receiving recess 10H1 formed in the first plate member 10, thereby coupling the load supporting key 43 and the first plate member 10. The key receiving recess 32 of the connecting member 30 is then fitted into the end of the load supporting key 43 projecting from the side surface of the first plate member 10, thereby coupling the connecting member 30 and the load supporting key 42. The bolt 40a is passed through the bolt through hole 31 provided at one of the connecting members 30, and inserted into the bolt through hole 43H of one of the load supporting keys 43. The bolt 40a is then passed through a bolt through hole 10H4 provided at the first plate member 10, inserted into the bolt through hole 43H of the other load supporting key 43, and screwed into the bolt screw hole 33 provided at the other connecting member 30. In this manner, the connecting member 30 is attached to the first plate member 10 with the bolt 40a. In this structure, the first plate member 10 does not require a hole through which a load supporting key having a large diameter is penetrated. Accordingly, it is possible to prevent the heat transfer performance of the first plate member 10 from being deteriorated.

Figure 18:
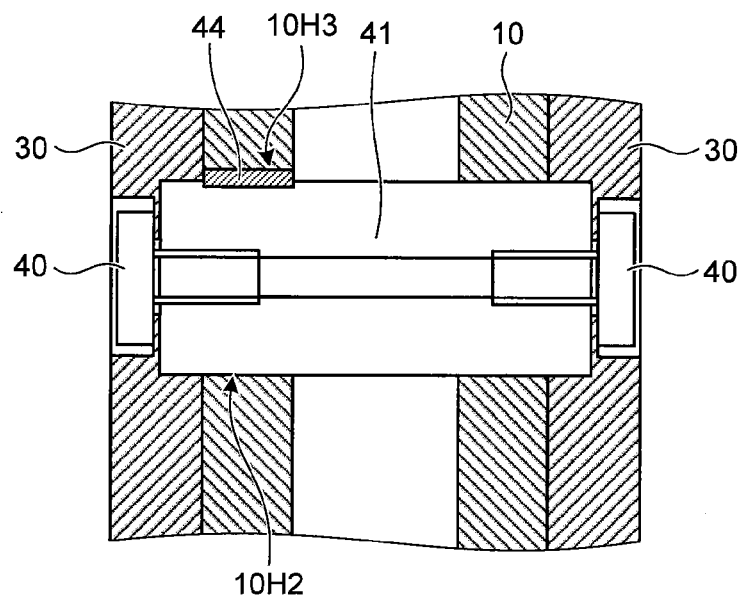
FIG. 18 is a sectional view of another structure of the portion in which the connecting members are attached to the first plate member in the basket according to the second embodiment.
Figure 19:
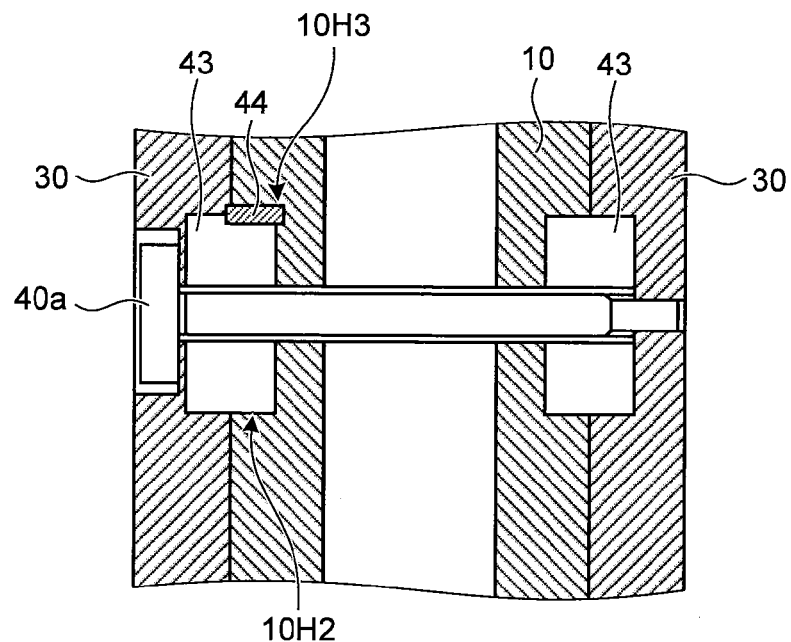
FIG. 19 is a sectional view of another structure of the portion in which the connecting members are attached to the first plate member in the basket according to the second embodiment.
Figure 20:
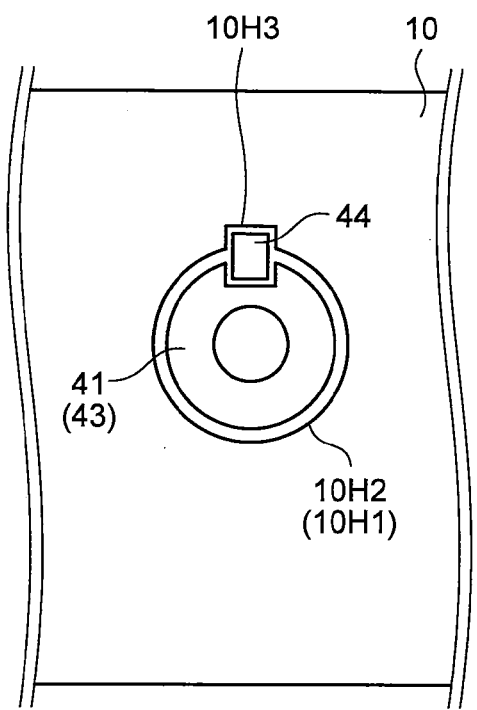
FIG. 20 is a front view of another example of the portion in which the connecting member is attached to the first plate member in the basket according to the second embodiment.

FIGS. 18 and 19 are sectional views of other structures of the portion in which the connecting members are attached to the first plate members in the basket according to the second embodiment. FIG. 20 is a front view of another example of the portion in which the connecting member is attached to the first plate member in the basket according to the second embodiment. In these structures, a fixed key 44 that is a rotation suppression member for suppressing the rotations of the keys 41 and 43 is provided at least one between the keys 41 and 43 that are load supporting units, and the first plate member 10, and between the keys 41 and 43, and the second plate member 20. The structure illustrated in FIG. 18 is a structure in which the fixed key 44 is provided in the structure illustrated in FIG. 13. The structure illustrated in FIG. 19 is a structure in which the fixed key 44 is provided in the structure illustrated in FIG. 16. The shape of the fixed key 44 may be rectangular as illustrated in FIG. 20. However, the rotation can also be suppressed by the circular-shaped fixed key 44.

As illustrated in FIGS. 18, 19, and 20, in the first plate member 10, a notch provided at a part of the key through hole 10H2 or the key receiving recess 10H1 is a fixed key groove 10H3. The fixed key 44 in a square pillar shape is inserted into a space formed by the fixed key groove 10H3, and the notch provided at the outer periphery of the load supporting key 41 or the load supporting key 43, thereby preventing the rotation of the load supporting key 41 or the load supporting key 43. In the present embodiment, the fixed key 44 is provided between the first plate member 10 and the load supporting key 41 or the load supporting key 43. However, the fixed key 44 may be provided between the connecting member 30 and the load supporting key 41 or the load supporting key 43.

The rotation of the load supporting key 41 or the load supporting key 43 can be prevented, by forming the cross-section perpendicular to the longitudinal direction of the load supporting key 41 or the load supporting key 43 in a non-circular shape. However, such a process requires a large amount of efforts. Accordingly, as the structure described above, by using the fixed key 44, an anti-rotation function can be provided on the load supporting key 41 and the like by a simple process. Upon assembling the basket 1a illustrated in FIG. 12, the fixed key 44 is attached to the load supporting key 41 and the like, and fixing them with the first plate member 10. Consequently, the basket 1a can be assembled at ease. The fixed key 44 is not limited to the one described above, but may be any one as long as it can suppress the rotation of the load supporting key 41 and the like.

In the present embodiment, in addition to the structure disclosed in the first embodiment, a load supporting unit that supports the load of the second plate member, in other words, the load in the direction perpendicular to the longitudinal direction of the connecting member, is provided between the fastening member and the connecting member, and between the fastening member and the first plate member. In this manner, in addition to the effects similar to those of the first embodiment, because of the load supporting unit, even if the load of the second plate member is applied to the fastening members, the load in the X direction is not as large as the load in the Y direction. Here, relative to the load in the Y direction, when the present embodiment is compared with the first embodiment in which only bolts are used as the fastening members, an area to receive the load in the Y direction can be increased. In this manner, even if the number of load supporting units (such as bolts) is reduced, it is possible to receive the load without fail. As a result, because the number of fastening members can be reduced, an operation of forming screw holes for the bolts, and an operation of screwing a large number of bolts into the screw holes, required when bolts are used as the fastening members can be reduced.

Third Embodiment

In a third embodiment, in addition to the structure in the first embodiment, a groove extending in the direction (direction in parallel with the cavity axis Z in FIG. 1) towards which the first plate members are stacked, is formed at the side surface of the first plate member, and the connecting member is fitted into the groove. Other structures are the same as those in the first embodiment.

Figure 21:
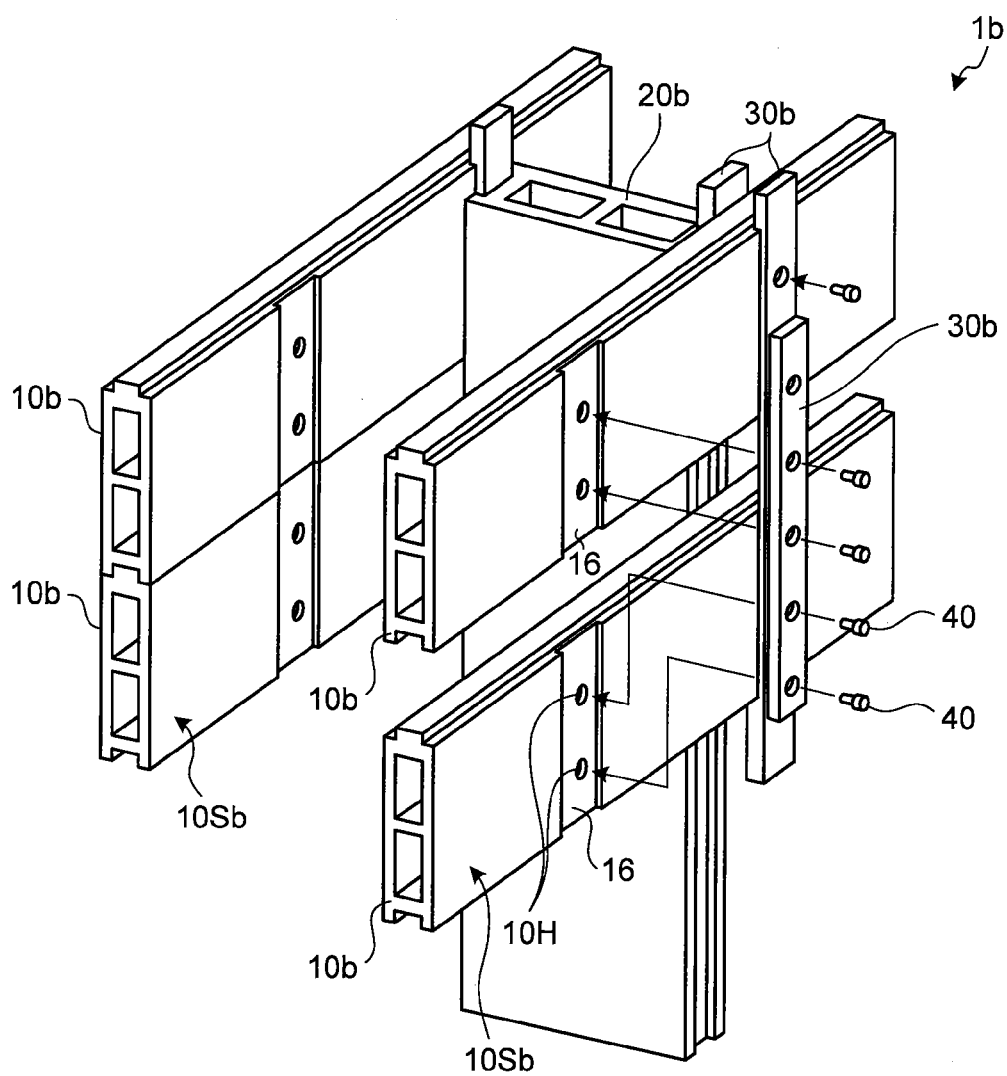
FIG. 21 is a perspective view of a basket according to a third embodiment.
Figure 22:
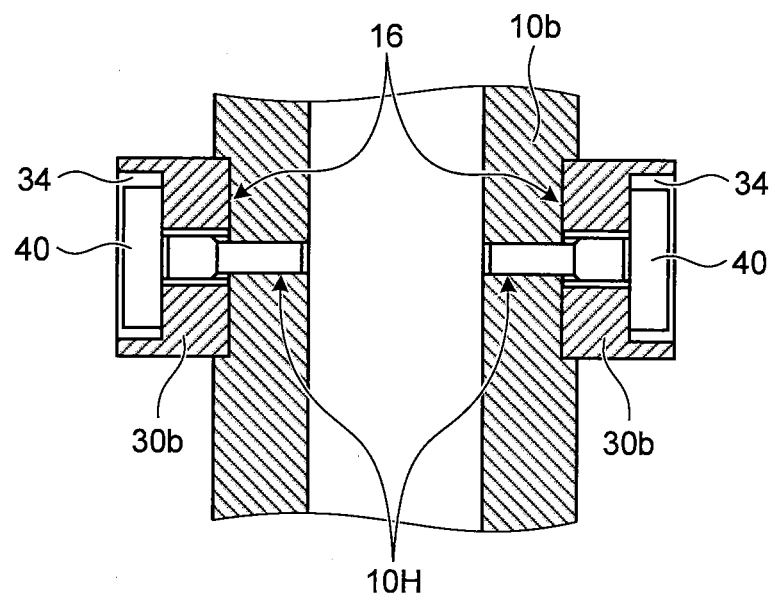
FIG. 22 is a sectional view of a portion in which connecting members are attached to a first plate member in the basket according to the third embodiment.
Figure 23:
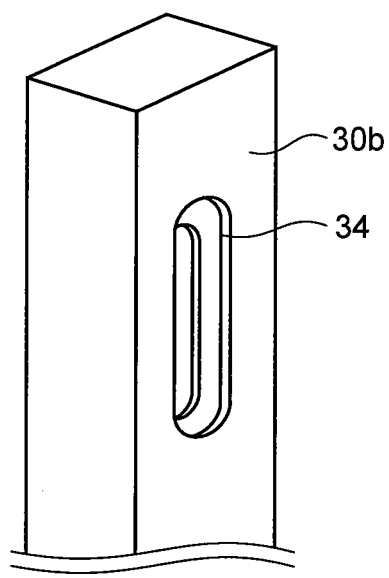
FIG. 23 is a perspective view of the connecting member of the basket according to the third embodiment.

FIG. 21 is a perspective view of a basket according to the third embodiment. FIG. 22 is a sectional view of a portion in which the connecting members are attached to the first plate member in a basket according to the third embodiment. FIG. 23 is a perspective view of the connecting member of the basket according to the third embodiment. In a first plate member 10b of a basket 1b according to the present embodiment, a groove (hereinafter, referred to as connecting member fitting groove) 16 is formed at a side surface 10Sb. The connecting member fitting groove 16 is formed in the direction towards which the first plate members 10b are stacked. Because the depth of the connecting member fitting groove 16 is such as to engage with a guiding member 30b, the strength deterioration of the first plate member 10b is suppressed to a minimum.

The connecting member 30b is attached to the connecting member fitting groove 16, and fastened and attached to the first plate member 10b with the bolts 40. As illustrated in FIGS. 22 and 23, the cross-section of the connecting member 30b perpendicular to the longitudinal direction is rectangular. A bolt through hole 34, through which the bolt 40 is penetrated, is formed in the connecting member 30b, at the side facing the first plate member 10b. The bolt through hole 34 is a long hole to which spot facing is performed. In this manner, as illustrated in FIG. 22, if the connecting member 30b is fastened and attached to the first plate member 10b by having the bolt 40 penetrated through the bolt through hole 34, the head of the bolt 40 is hidden in the bolt through hole 34. Consequently, the head of the bolt 40 can be prevented from being projecting from the side surface 30A of the connecting member 30b.

A material having a high thermal conductivity, for example, a heat transfer accelerating layer made of a metal paste such as a silver paste or a copper paste, or a carbon paste may be inserted between the connecting member fitting groove 16 and the connecting member 30b fitted into the connecting member fitting groove 16. In this manner, the heat transfer performance between, a second plate member 20b and the first plate member 10b is improved, thereby further improving the heat transfer characteristics of the entire basket. Accordingly, it is preferable to form such a heat transfer accelerating layer.

The screw holes 10H are formed in the connecting member fitting groove 16 provided at the side surface 10Sb of the first plate member 10b. Upon fitting the connecting member 30b into the connecting member fitting groove 16, the bolt 40 is penetrated through the bolt through hole 34 of the connecting member 30b, and screwed into each of the screw holes 10H of the first plate member 10b. Accordingly, the connecting member 30b is fastened and attached to the connecting member fitting groove 16. The connecting members 30b placed opposite from each other are fitted into the recesses of the second plate member 20b, to which recesses for coupling with the connecting members 10b are formed at both long side ends, thereby forming the basket 1b.

In the basket 1b, the connecting member 30b is fitted into the connecting member fitting groove 16 formed at the side surface 10Sb of the first plate member 10b, and the load of the second plate member 20b, in other words, the load in the direction perpendicular to the longitudinal direction of the connecting member 30b is received by the connecting member 30b and the connecting member fitting groove 16. In this manner, because an area to receive the load is increased, very little load is applied to the bolts 40. Accordingly, the diameter of the bolt 40 may be small, and the number of bolts 40 may be reduced, thereby reducing the operation of forming screw holes for the bolts 40, and the operation of screwing a large number of bolts 40 into the screw holes. Because the diameter of the bolt 40 may be small, and the number of bolts 40 may be reduced, the manufacturing costs of the basket 1b can be reduced.

Figure 24:
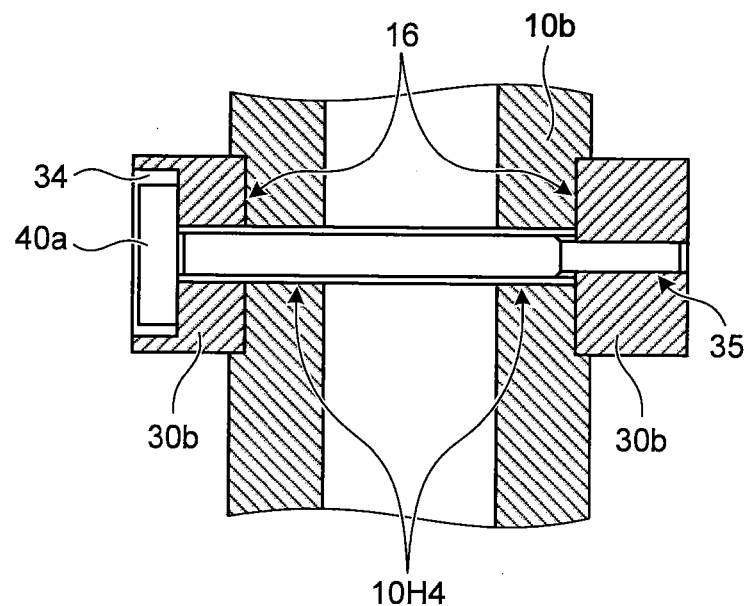
FIG. 24 is a sectional view of another structure of the portion in which the connecting members are attached to the first plate member in the basket according to the third embodiment.

FIG. 24 is a sectional view of another structure of the portion in which the connecting members are attached to the first plate member in the basket according to the third embodiment. In this structure, the first plate member 20b has the bolt through hole 10H4 through which the bolt 40a is penetrated. The bolt through hole 34 is provided at one of the connecting members 30b attached to the both side surfaces of one piece of the first plate member 10b, and a bolt screw hole 35 is provided at the other connecting member 30b. The length of the bolt 40a extends from one of the connecting members 30b to the other connecting member 30b through the first plate member 10b.

To attach each of the connecting members 30b to the first plate member 10b, the connecting member 30b is fitted into the connecting member fitting groove 16, thereby coupling the connecting member 30b and the first plate member 10b. The bolt 40a is passed through the bolt through hole 34 provided at one of the connecting members 30b, inserted into the bolt through hole 10H4 of the first plate member 10b, and screwed into the bolt screw hole 35 provided at the other connecting member 30b. Accordingly, the connecting members 30b are attached to the first plate member 10b with the bolt 40a. In this structure, screw holes need not be formed at both side surfaces of the first plate member 10b. Consequently, it is possible to reduce the number of processes of forming the screw holes as much.

Figure 25:
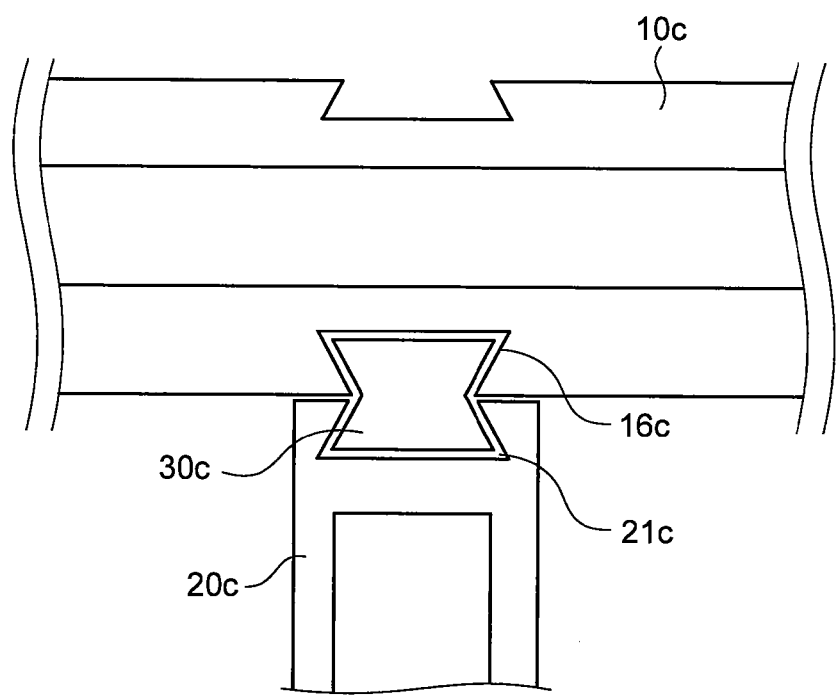
FIG. 25 is a sectional view of another structure of the portion in which the connecting member is attached to the first plate member in the basket according to the third embodiment.

FIG. 25 is a sectional view of another structure of the portion in which the connecting member is attached to the first plate member in the basket according to the third embodiment. In this structure, a connecting member fitting groove 16c formed at a first plate member 10c and recesses 21c provided at both ends of a second plate member 20c are all formed into dovetail groove shapes. Accordingly, the first plate member 10c and the second plate member 20c are coupled by a connecting member 30c, fitted into the connecting member fitting groove 16c and the recess 21c.

In this structure, the shapes and sizes of the connecting member fitting groove 16c and the recess 21c are preferably the same. If the shapes and sizes thereof are the same, when the connecting member 30c is fitted into the first plate member 10c, they can be assembled without paying attention to the direction, thereby improving workability. A material having a high thermal conductivity, for example, a heat transfer accelerating layer made of a metal paste such as a silver paste or a copper paste, or a carbon paste may be inserted between the connecting member fitting groove 16c and the connecting member 30c, and between the recess 21c and the connecting member 30c fitted into the recess 21c. In this manner, the heat transfer performance between the second plate member 20c and the first plate member 10c is improved, thereby further improving the heat transfer characteristics of the entire basket. The heat transfer accelerating layer made of a metal paste such as a silver paste or a copper paste, or a carbon paste can eliminate the risk of material loss due to galling that occurs when the first plate member 10c and the second plate member 20c are assembled into a basket. Accordingly, it is preferable to form the heat transfer accelerating layer.

The width (size in the direction perpendicular to the direction towards which the connecting member fitting groove 16c is formed) of the connecting member fitting groove 16c formed in the first plate member 10c is increased towards the inside from the opening portion. The width (size in the direction perpendicular to the direction towards which the recess 21c is formed) of each of the recesses 21c formed at both ends of the second plate member 20c is increased towards the inside from the opening portion. The shape of the cross-section of the connecting member 30c perpendicular to the longitudinal direction is formed in a shape in which upper bases of the trapezoids are connected.

In such a structure, the connecting member 30c is fitted into the connecting member fitting groove 16 of the first plate member 10, and into the recess 21c of the second plate member 20, thereby coupling the first plate member 10c and the second plate member 20c. In such a structure, the connecting member 30c is meshed with the connecting member fitting groove 16 of the first plate member 10, and with the recess 21c of the second plate member 20. Accordingly, the assembly and handling of the basket are facilitated, thereby preventing deviation between the first plate member 10c and the second plate member 20c.

In the present embodiment, in addition to the structure disclosed in the first embodiment, a connecting member fitting groove extending in the direction towards which the first plate members are stacked is formed at the side surface of the first plate member, and a connecting member is fitted into the connecting member fitting groove. The connecting members placed opposite from each other are fitted into the recesses of the second plate member to which recesses for coupling with the connecting members are formed at both long side ends. In this manner, in addition to the effects similar to those of the first embodiment, because of the load of the second plate member in the Y direction is received by the connecting member and the connecting member fitting groove, the load in the Y direction is scarcely applied to the fastening members (such as bolts). In this manner, even if the number of load supporting units is reduced, the load in the Y direction can be received without fail. As a result, the number of fastening members can be reduced, and if bolts are used as the fastening members, the bolts with a small diameter can be used. The operation of forming screw holes for the bolts and the operation of screwing a number of bolts into the screw holes can be reduced, thereby reducing manufacturing costs of the basket.

INDUSTRIAL APPLICABILITY

In this manner, the recycled fuel assembly storage basket, the recycled fuel assembly storage container, and the method for manufacturing the recycled fuel assembly storage basket according to the present invention can be advantageously used for transporting and storing recycled fuel assemblies. More specifically, the recycled fuel assembly storage basket, the recycled fuel assembly storage container, and the method for manufacturing the recycled fuel assembly storage basket are suitable for reducing the number of cutting processes on the members of the recycled fuel assembly storage basket.

The invention claimed is:

1. A recycled fuel assembly storage basket comprising:
a plurality of rectangular first plate members being stacked with long side ends thereof abutting to each other;
a plurality of connecting members extended in a direction towards which the first plate members are stacked, attached to a side surface of each of the first plate members being stacked, connecting the first plate members, and projecting from the side surface;
a plurality of rectangular second plate members both of whose long side ends have recesses into which the connecting members are fitted; and
a recycled fuel assembly stored in a space surrounded by the first plate members and the second plate members.

2. The recycled fuel assembly storage basket according to claim 1, wherein each of the first plate members and the second plate members has a through hole penetrating in a longitudinal direction.

3. The recycled fuel assembly storage basket according to claim 1, wherein a cross-section of each of the connecting members perpendicular to the longitudinal direction is a trapezoid, and an upper base of the cross-section comes into contact with the side surface of each of the first plate members.

4. The recycled fuel assembly storage basket according to claim 3, wherein a cross-section of each of the recesses in the second plate members perpendicular to the longitudinal direction is a trapezoid, and an upper base side of the cross-section comes into contact with the side surface of each of the first plate members.

5. The recycled fuel assembly storage basket according to claim 1, wherein the second plate members and the connecting members are made of different materials.

6. The recycled fuel assembly storage basket according to claim 1, wherein the connecting members are divided at different positions in the direction towards which the first plate members are stacked.

7. The recycled fuel assembly storage basket according to claim 1, wherein the connecting members are attached to the first plate members by a fastening member.

8. The recycled fuel assembly storage basket according to claim 7, wherein a through hole is provided at a side of each of the connecting members, and the fastening member penetrates through the through hole.

9. The recycled fuel assembly storage basket according to claim 7, further comprising a load supporting unit that supports a load of the second plate members between the fastening member and the connecting member, and between the fastening member and the first plate members.

10. The recycled fuel assembly storage basket according to claim 9, further comprising a rotation suppressing member that suppresses rotation of the load supporting unit at least one of between the load supporting unit and the first plate members, and between the load supporting unit and the second plate members.

11. The recycled fuel assembly storage basket according to claim 7, further comprising a reinforcement member made of a material having higher stiffness than that of the first plate members inside the through hole of the first plate members, the reinforcement member being connected with the fastening member.

12. The recycled fuel assembly storage basket according to claim 1, wherein a groove extending in the direction towards which the first plate members are stacked is formed on the side surface of each of the first plate members, and the connecting member is fitted into the groove.

13. A recycled fuel assembly storage container comprising:

a trunk having an opening portion and a cavity;

a lid attached to the opening portion and sealing the cavity; and the recycled fuel assembly storage basket of claim 1 which is disposed in the cavity.

14. A method for manufacturing a recycled fuel assembly storage basket comprising:

stacking a plurality of rectangular first plate members with long side ends thereof abutting to each other;

forming a plurality of plate member joint bodies by connecting the first plate members with connecting members attached to a side surface of each of the first plate members and projecting from the side surface;

disposing side surfaces of the plate member joint bodies so as to face each other, and placing the connecting members opposite from each other; and inserting the connecting members placed opposite from each other into recesses formed at both of long side ends of a rectangular second plate member.

* * * * *